United States Patent [19]

Shirai et al.

[11] Patent Number: 5,146,264
[45] Date of Patent: Sep. 8, 1992

[54] RECORDING SYSTEM

[75] Inventors: Masahiro Shirai, Tokyo; Yoshihiko Yoshihara, Yokohama, both of Japan

[73] Assignee: Canon Kabushiki Kaisha, Tokyo, Japan

[21] Appl. No.: 586,134

[22] Filed: Sep. 21, 1990

[30] Foreign Application Priority Data

Sep. 26, 1989 [JP] Japan .................................. 1-248186
Sep. 26, 1989 [JP] Japan .................................. 1-248188

[51] Int. Cl.5 ........................ G03B 27/32; G03B 27/52
[52] U.S. Cl. ...................................... 355/27; 355/100; 355/106; 352/157
[58] Field of Search .......................... 355/27, 100, 106; 352/157

[56] References Cited

U.S. PATENT DOCUMENTS

| | | | |
|---|---|---|---|
| 1,973,477 | 9/1934 | Fritts | 352/157 |
| 3,489,370 | 1/1970 | Mouissie | 352/157 |
| 4,158,496 | 6/1979 | Cieplik | 355/27 |
| 4,697,918 | 10/1987 | Kogane | 355/27 |
| 4,801,973 | 1/1989 | Takagi et al. | 355/27 |

Primary Examiner—Monroe H. Hayes
Attorney, Agent, or Firm—Fitzpatrick, Cella, Harper & Scinto

[57] ABSTRACT

A recording system in which film stored in a state of loops can be fed smoothly due to the film guide members which can change their positions depending on the amount of films a sensor means has detected. In addition, the assembly of a film transport unit and a development container can be mounted or dismounted to or from the development unit easily.

13 Claims, 24 Drawing Sheets

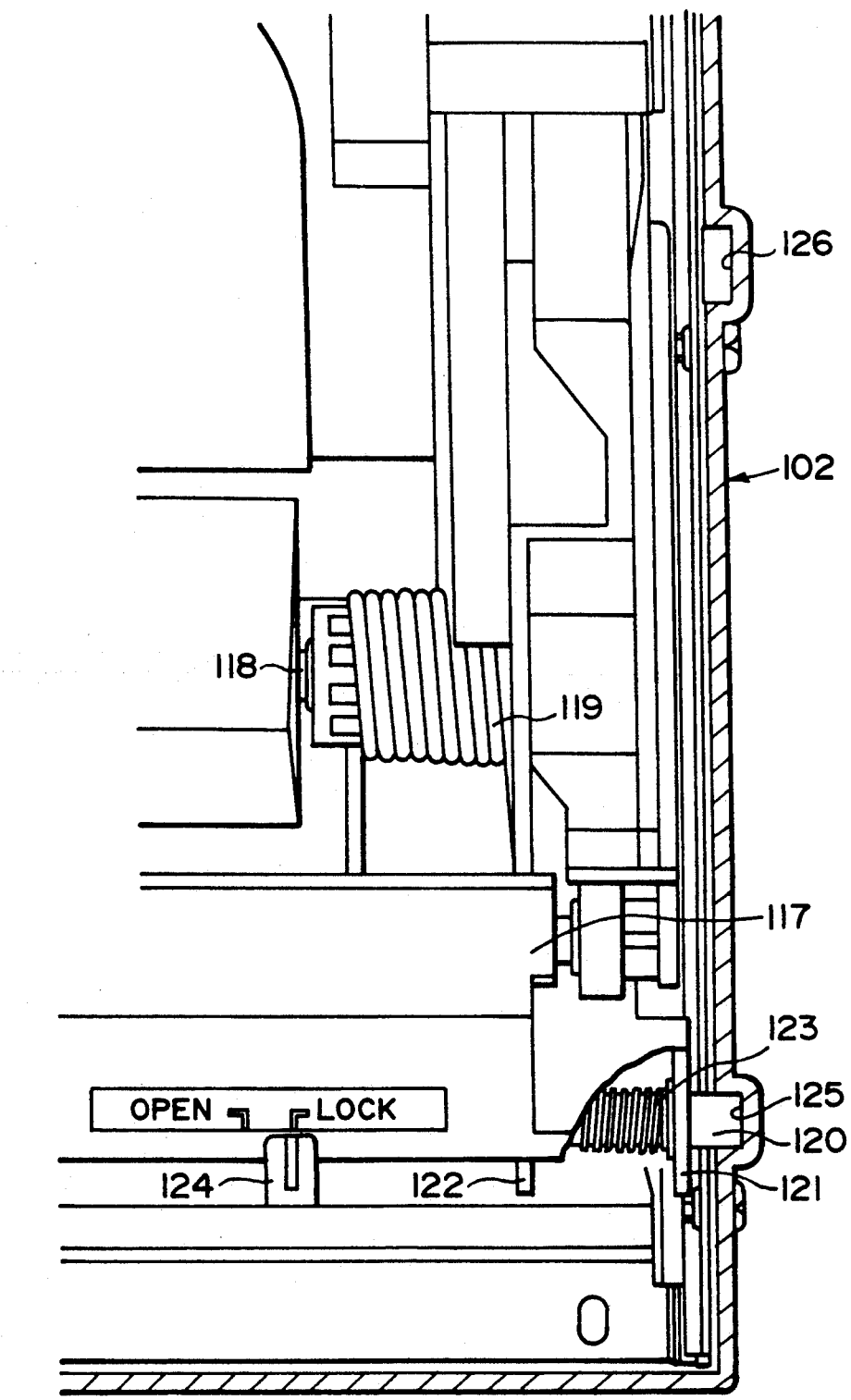
F I G. 16

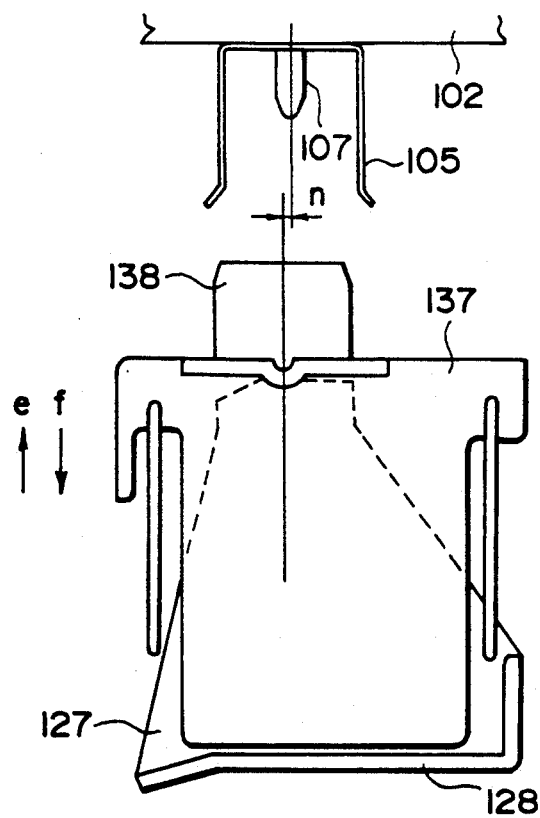
F I G. 21
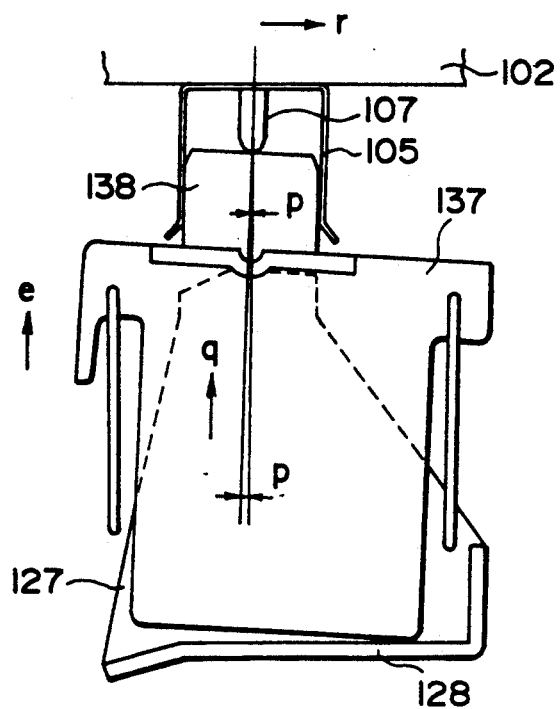
F I G. 22

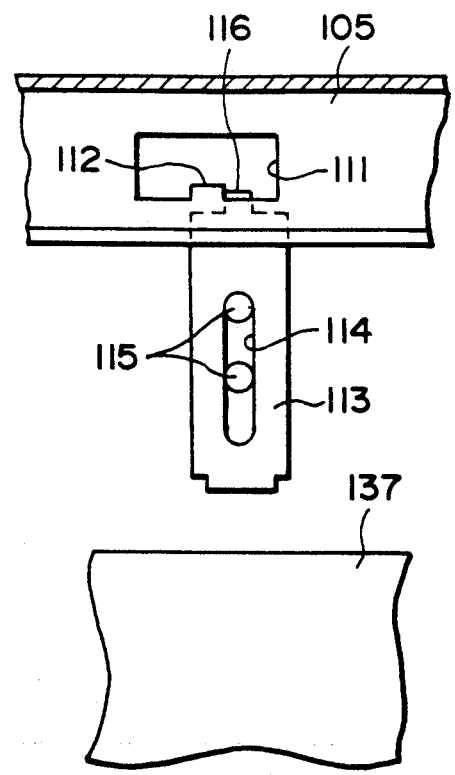
F I G. 23
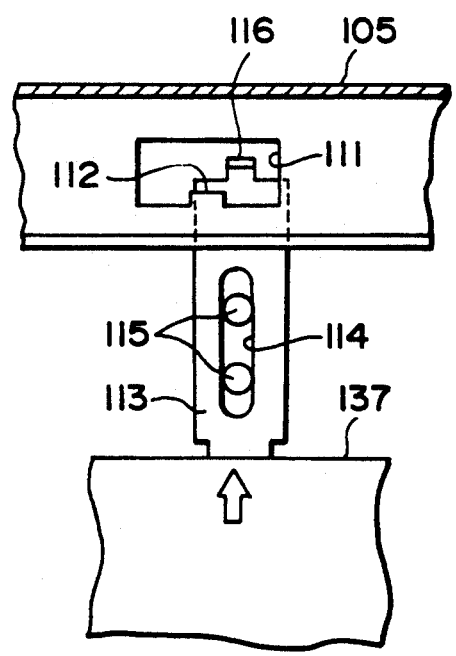
F I G. 24

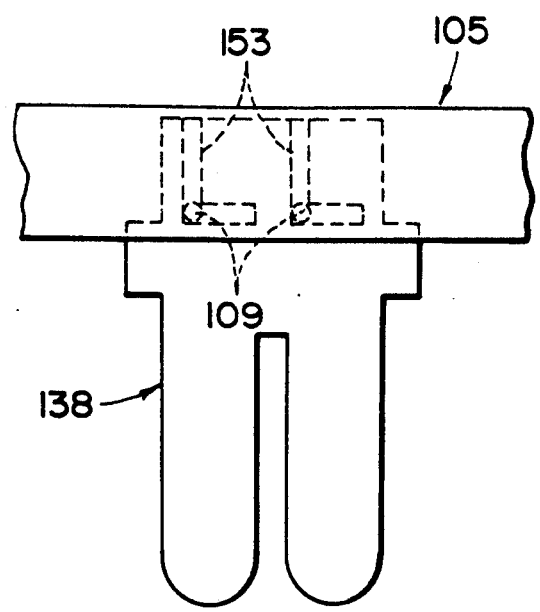
F I G. 27
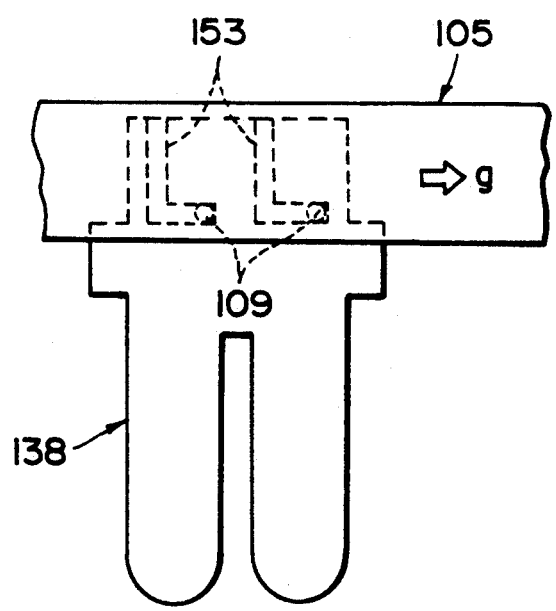
F I G. 28

# RECORDING SYSTEM

BACKGROUND OF THE INVENTION

1. Field of the Invention

This invention is related to a recording system which exposes micro film or any other elongated web to produce an original image on it, stores the exposed film as film loops in a storage room temporarily, and then develops the exposed film using a processor.

2. Related Background Art

A processor camera or an integration of a camera (photography unit), film storage unit and processor (film processing unit), which can effect an after exposure film processing, has come to be used generally due to its advantages of immediate processability and operability. Conventionally, a film storage unit for this type of processor camera is installed in the processor camera as shown in FIG. 39. The processor camera is a photography system with an automatic developing machine which consists of a photography unit (51) for photographing a subject on film and a developing unit (52) for automatically developing the exposed film.

Aiming to control the differences in film (F) feeding speeds between the photography unit (51) and developing unit (52) and prevent from wasting film (F), the processor camera usually employs a storage unit which temporarily stores film (F) of a given length exposed in the photography unit (51) in a storage chamber (53) before advancing it to the next developing process, and then feeds the stored film (F) to the developing unit (102).

Namely, the storage chamber (53) is positioned between the photography unit (51) and developing unit (52), and stores film (F) in a state of loops. Then, the storage chamber (53) incorporates a supply means for feeding film (F) into the storage chamber (53) and a discharge means for sending film (F) out of the storage chamber (53). The film (F) sent from the storage chamber (53) is cut out to an intended length by the cutter (56).

However, with the conventional art above, when the amount of film (F) to be stored in the storage chamber (53) increases, the storage chamber (53) becomes, obviously, full of film loops (F). As a result, when film (F) is fed from the storage chamber (53) into the developing unit (52), an intermediate loop is wound around the discharge means (55). This is a serious problem. In addition, to automatically route the film (F) tip from the transfer means (54) in the storage chamber (53) to the discharge means (55), a guide member for guiding film (F) is needed in the middle of the route. However, considering into the fact that only the transfer means is driven to store film (F) in the storage chamber (53) afterward, such a guide member becomes a hindrance. Consequently, the film tip is manually set by a given length. This causes a nuisance.

The development container must be dismounted to maintain and control the developing unit in the film processing unit. When the development container is dismounted or mounted, it is sometimes hit against the main unit of the system. This causes the development container to be damaged or deformed, or to fall down and spill developer all over. Thus, the operability is poor.

SUMMARY OF THE INVENTION

This invention is designed to solve the above problems underlying the conventional art and has for its object to supply a recording system that makes it possible to automatically load the film tip without disturbing the state of film stored in the storage chamber and prevent a film loop from being, wound around the discharge means at the time of transport.

This invention also has for its object to provide a developing system that can, prevent the development container, which is mounted to the main unit with film transport units from being damaged or deformed, and that will not cause a user to spill any processing solution contained when mounting or dismounting the development container.

Moreover, the invention has for its object to provide a recording system that allows the user not only to mount and fix, or dismount the film transport units into or from the main unit without touching them directly but also to fix the film transport units at the given positions through a simple operation.

Another object of the invention is to provide a recording system that can prevent a user from dropping the film transport unit accidentally with only the development container removed from the main unit.

BRIEF DESCRIPTION OF THE DRAWINGS

FIGS. 9 to 37 show embodiments of the developing system.

FIGS. 9 to 11 show perspective views of the developing system.

FIG. 12 shows a perspective view of the fixing member and part of the film transport unit.

FIGS. 13 to 15 are lateral cross-sectional drawings of the main unit of the system.

FIGS. 16, 17, and 37 show partial front views of the lever lock feature.

FIG. 18 shows a perspective view of the lift on one side.

FIG. 19 shows a perspective view of the film transport unit and development container.

FIGS. 20 to 22, 35, and 36 show side views of the lift on which the development container is loaded.

FIGS. 23 to 26 show partial front views for the operation of the lock member.

FIGS. 27 and 28 show front views for the sliding movement of the fixing member.

FIGS. 29 and 30 show perspective views of the other of embodiments of a fixing means for the film transport unit.

FIGS. 31 and 32 show front views of the other embodiments of a fixing means for the film transport unit.

FIG. 33 shows a perspective view of the film transport unit and development container.

FIG. 34 shows a perspective view of the development container.

DESCRIPTION OF THE PREFERRED EMBODIMENTS

Figure 1:
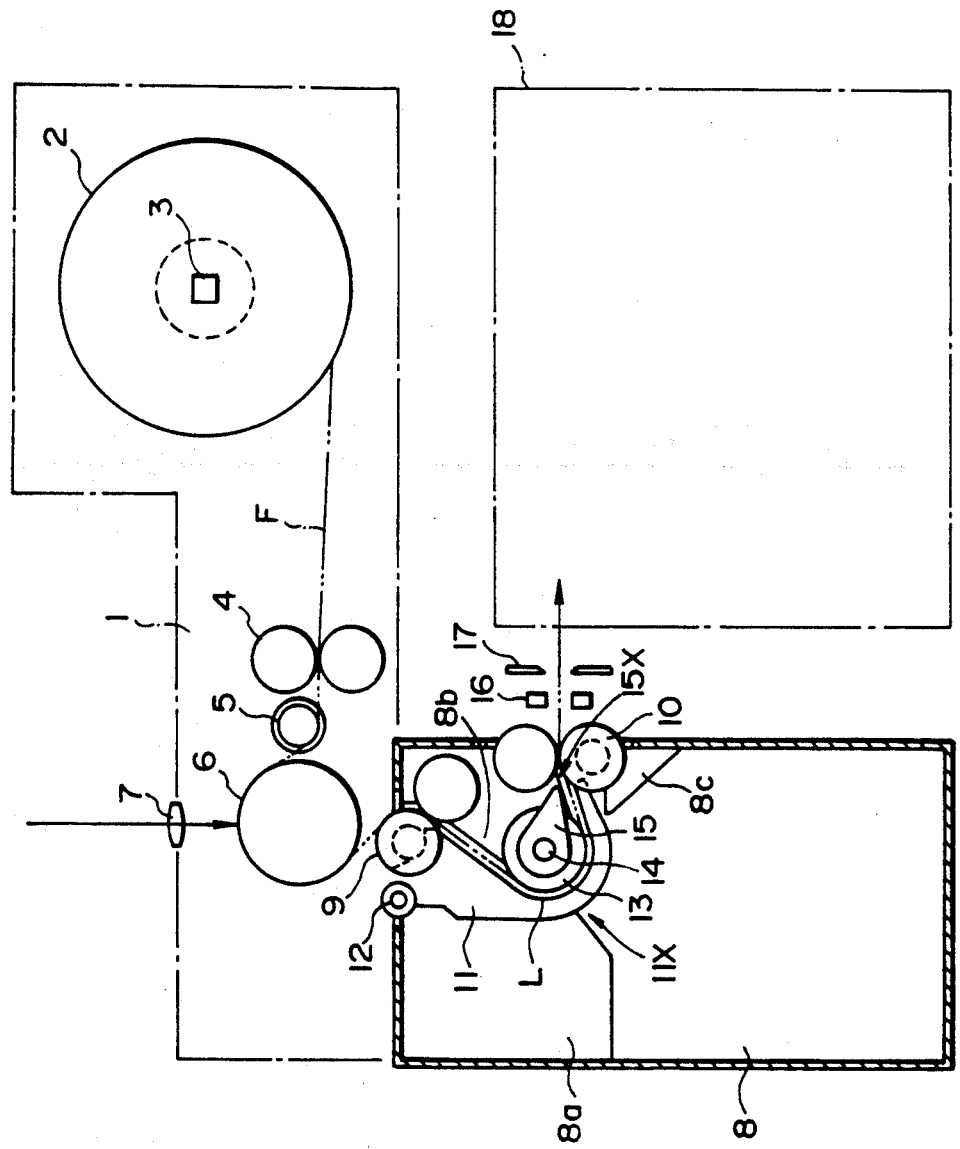
FIG. 1 is a schematic block diagram of a processor camera in which this invention is implemented.
Figure 2:
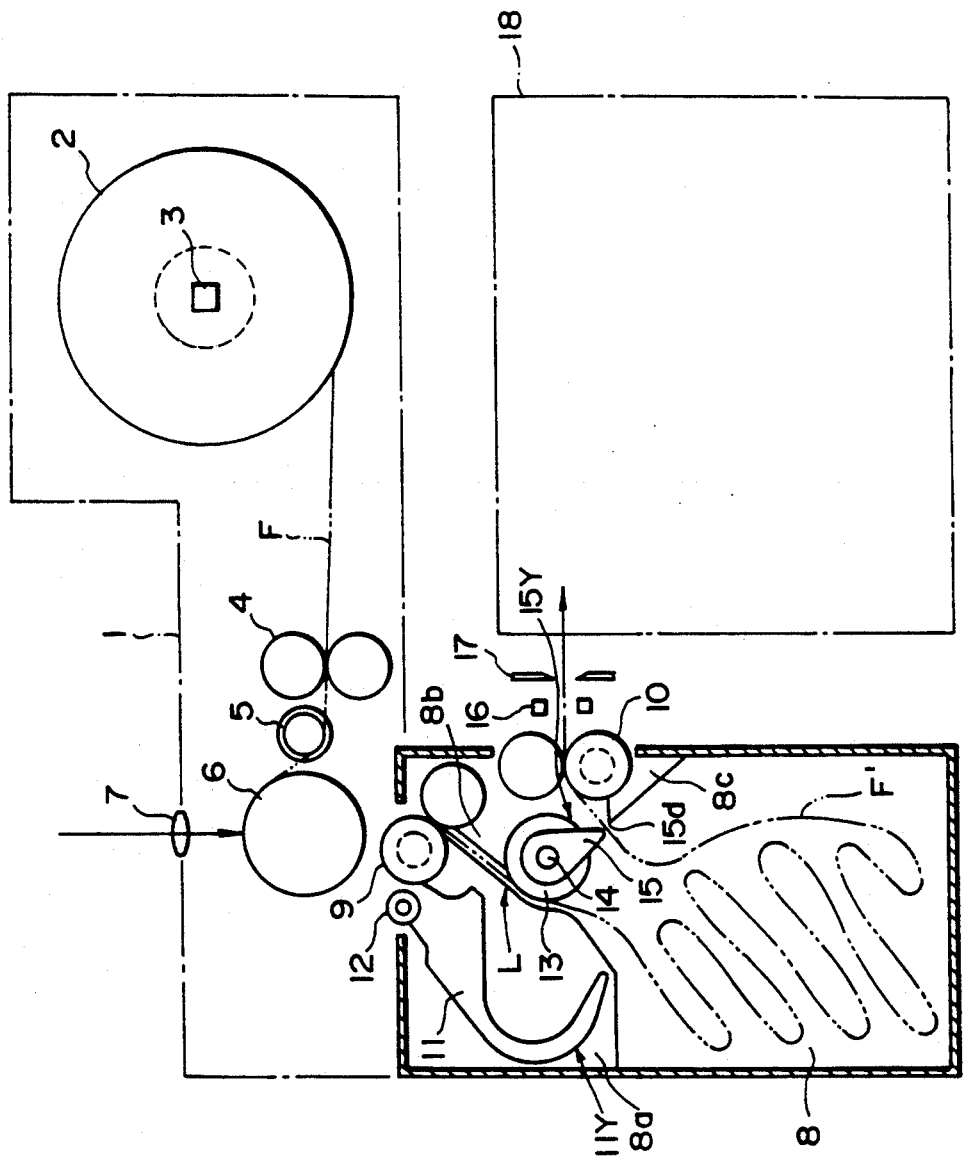
FIG. 2 is a schematic block diagram when film is stored in the processor camera shown in FIG. 1.

This invention is explained below based on the schematics of embodiments. FIGS. 1 and 2 show the processor camera which is adopted in an embodiment of this invention. This processor camera is equipped with a photography unit (1) and a developing unit (18). A film storage chamber (8) is installed on the transport line between the photography unit (1) and the developing unit (18).

In the photography unit (1), a supply reel (2) around which unexposed film (F) is wound is mounted on the supply axle (3). Film (F) is routed to a pair of supply rollers (4), wound around a photography roller (6) passing through a positioning roller (5), and then sent to a storage chamber (8). The positioning roller (5) aligns film (F) laterally and is located near the photography roller (6). The image of a subject which is not illustrated is formed on film (F) on the photography roller (6) via the photographing lens (7).

The storage chamber (8) has an approximate rectangular parallelepiped shape whose depth is greater than the width. In the top end, a transfer roller (9) is installed. Discharge rollers (10) are provided on the side facing the developing unit (18). In the storage chamber (8), a guide roller (13) is positioned between the transfer roller (9) and discharge rollers (10). The storage chamber (8) is also equipped with a film guide lever (11) or the first film guide member to form a specific film transport line (L) between the transfer roller (9) and discharge rollers (10). The film transport line (L) is a U-shaped path running from the transfer roller (8) through the guide roller (13) to the discharge rollers (10). Film (F) is led along the inner edge of the film transport line (L) forming a U shape. The film guide lever (11) guides either of the front or back of film (F). In this embodiment, the exposed surface of film (F) is guided. The film guide lever (11) can withdraw from the film transport line (L) while film is being stored, because the end of the transfer roller (9) is supported rotatively with a rotation axis (12) as a supporting point.

Figure 3:
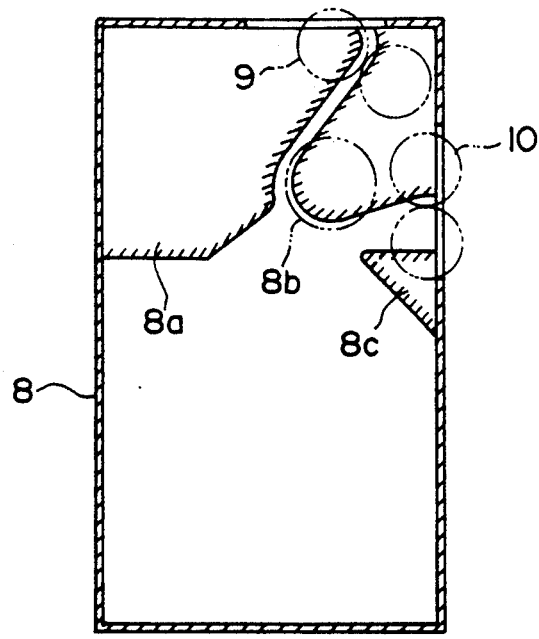
FIG. 3 shows a plan view of the guide wall of the storage chamber.
Figure 5:
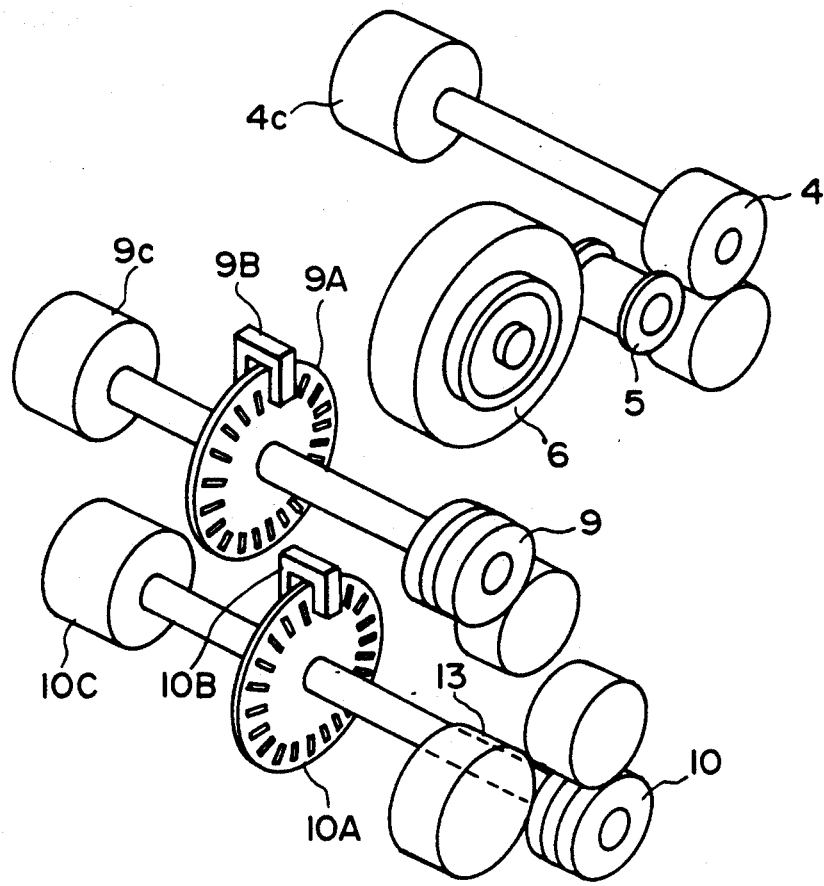
FIG. 5 shows a perspective view for the outline configuration of the transport mechanism of the system in FIG. 1.

As shown in FIG. 3, depending on the shape of the film transport line, the first, second, and third guide walls (8a, 8b, and 8c) are formed on both sides of the storage chamber (8) to guide both lateral edges of film. The second guide wall (8b) is formed in a U shape to go along with the film transport line (L) and controls the film (F) moving direction in combination with the film guide lever (11). The third guide wall (8c) is installed near the discharge slot, facing a film separating lever (15) or the second film guide member.

The film separating lever (15), which is installed near the discharge rollers (10), narrows the transport line of film (F) to prevent a loop of film (F) from winding around a discharge roller (10). In this embodiment, the film separating lever (15) is attached rotatively to the rotation axis (14) of the guide roller (13). The film separating lever (15) has a triangular tip member (15a) which can be set at either an automatic loading position (15X) or a film separating position (15Y) selectively.

Figure 4:
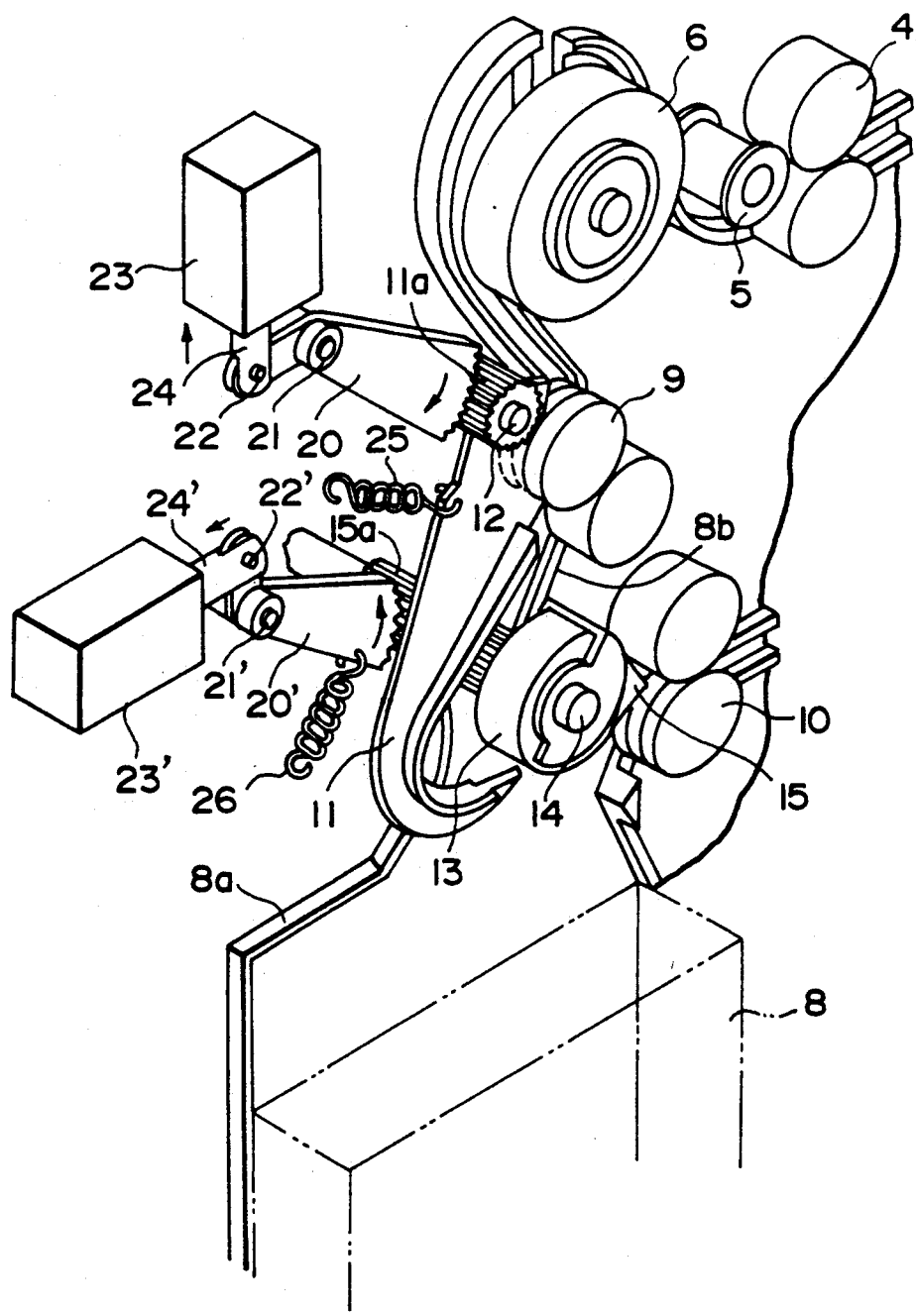
FIG. 4 shows a perspective view for the outline configuration of the driving system of the film guide member of the system in FIG. 1.

FIG. 4 shows an embodiment of the mechanism which operates the film guide lever (11) and film separating lever (15). A gear (11a) is integrated with the film guide lever (11) in the periphery of the rotating section of the film guide lever (11). A gear (20) having a sector shape is engaged with the gear (11a). Another end of the sector gear (20) is engaged with a plunger (24) of a solenoid (24) via a connection pin (22). Therefore, when the plunger (24) is drawn in, the gear (2) rotates in the arrow direction shown in FIG. 4 with the rotation axis (21) as a supporting point. This causes the gear (11a) to rotate. As a result, the film guide lever (11) enters in the film loading (automatic feeding) state shown in FIG. 1. A return spring (25) is coupled onto the film guide lever (11). When the attraction force of the solenoid (23) is released, the return spring (25) returns the film guide lever (11) to the withdrawal position (11Y) shown in FIG. 2.

In the same manner, a gear (15a) is integrated with the film separating lever (15) in the periphery of the rotation axis (14). A sector gear (20') engaged with the gear (15a), a plunger (24') and a solenoid (23') engaged with another end of the sector gear (20') via a connection pin (22'), are installed. When the solenoid (23') magnetically draws in the plunger (24'), the gear (20') rotates in the arrow direction shown in FIG. 4 with the rotation axis (21') as a supporting point. Then, when the gear (15a) rotates, the film separating lever moves to the separating position (15Y) shown in FIG. 2. A return spring (26) is coupled to the gear (20) at a certain point. When the attraction force of the solenoid (23') is released, the return spring (26) causes the lever (15) to set at the automatic loading position (15X) shown in FIG. 1.

A film cutter (17) is interposed between the discharge rollers (10) and developing unit (18). A film sensor (16) is positioned between the cutter (17) and the discharge rollers (10).

Next, the operations of the recording system having the P configuration are explained. The storage chamber (8) shown in FIG. 1 is in a state of initial loading. Film (F) fed by the supply rollers (4) in the photography unit (1) is routed into the storage chamber (8) and transported from the transfer roller (9) to discharge rollers (10) while being guided by the film guide lever (11). At this time, the film separating lever (15) is positioned at the auto loading position (15X) so that it will not hinder transportation of film F. Then, the film (F) that is fed into the developing unit (18) after getting out of the storage chamber via the discharge rollers (1) is detected by a sensor (16) which detects the tip of film (F) to stop the rotation of the rollers (10). At this moment, the film (F) halts temporarily. That is to say, the film (F) tip is caught and held by the discharge rollers (10).

After that, as shown in FIG. 2, the transfer roller (9) only rotates to store film (F) in the storage chamber (8). At this time, the film guide lever (11) withdraws to the withdrawal position (11Y) by rotating with the rotation axis (12) as a supporting point so that it will not interrupt the film (F) storage operation. The film separating lever (15) moves to the separating position (15Y) by rotating with the rotation axis (14) of the guide roller (13) as a supporting point.

To discharge film (F) from the storage chamber (8), the discharge rollers (10) rotate. At this time, the film separating lever (15) works to narrow the film (F) discharge slot in cooperation with the third guide wall (8c) in the storage chamber (8). Therefore, although film (F) is stored as loops in the storage chamber (8), loops are made apart at this slot (8d) so that the film will not be folded or an intermediate loop will not be wound around a discharge roller (10) to cause a transport error (film jam). Therefore, it is not necessary to concern about the possibility that exposed film (F) may be spoiled. In particular, in this embodiment, the film separating lever (15) at the separating position (15Y) and the third guide wall (8c) straighten the film at the opening of the discharge slot (8d). This greatly contributes to prevent film from being wound around a roller (10).

Preferably, a solenoid incorporating a permanent magnet should be used as a drive solenoid (23') for the film separating lever (15) shown in FIG. 4. Thereby, even if the power supply is turned off after drawing in a plunger, the permanent magnet retains the plunger (24). This makes it possible to hold the film separating lever (15) at the separating position shown in FIG. 2. Therefore, when film (F') is stored in the storage chamber (8) or left intact for an extended period of time, retaining power is unnecessary. This helps save power and allows the film separating lever (15) to stay at the same position even after the power supply of the system is turned off.

On the other hand, to return the film separating lever (15) to the automatic loading position (15A) after the stored film (F') has been discharged, the pulse current which is inverse to that for attraction is applied to the solenoid (23').

Preferably the film separating lever (15) should be returned immediately before film (F') stored in the storage chamber (8) has been discharged and no loop is left. Alternatively, the film separating lever (15) may be returned by elongating film (F) between the guide roller (13) and film separating lever (15) after film (F) has fully been discharged from the storage chamber (8).

Figure 6:
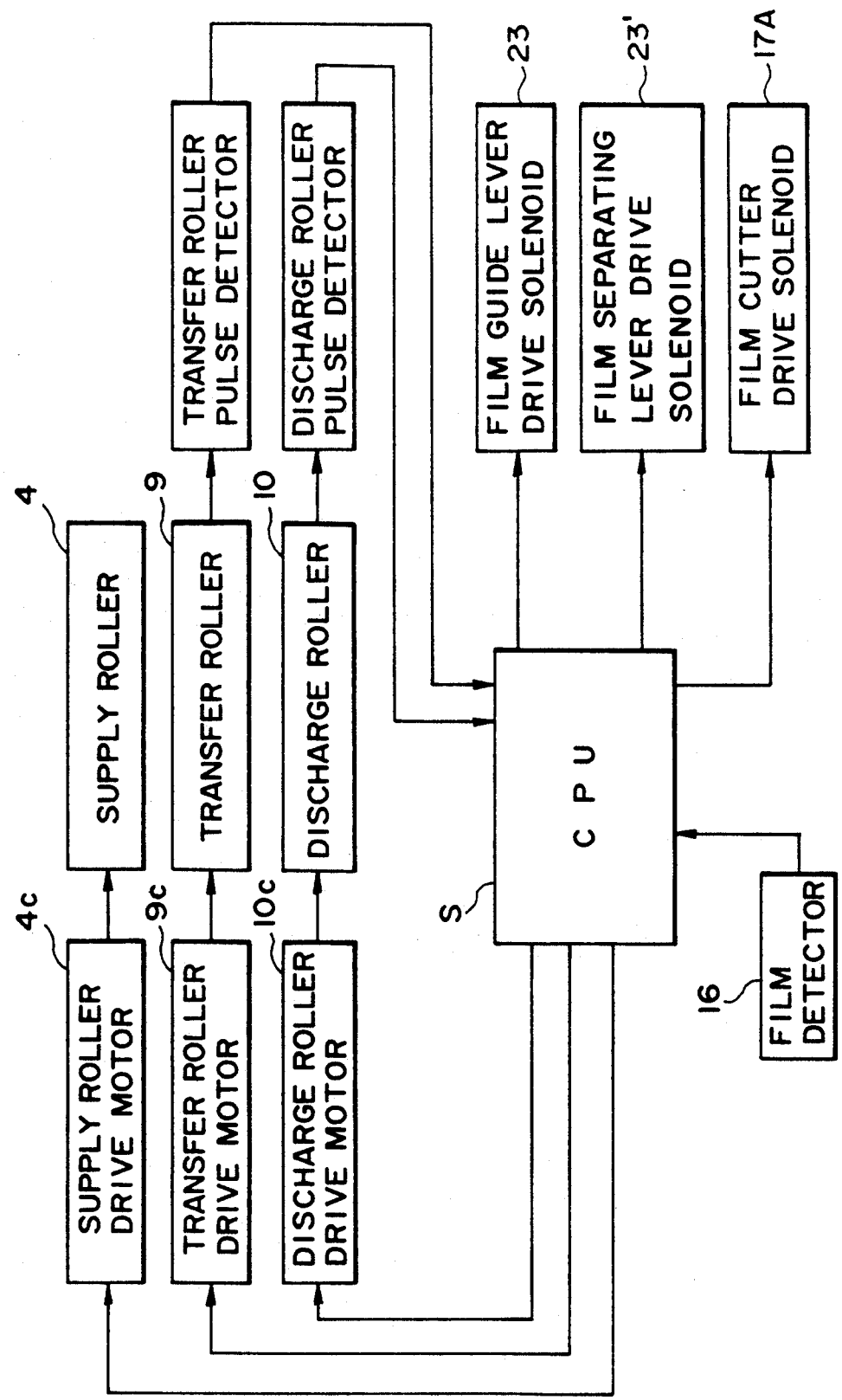
FIG. 6 is a control block diagram of the system shown in FIG. 1.

In this embodiment, the length of film (F) in the storage chamber (8) is calculated by counting the number of pulses by the photo interrupters (9B and 10B) and the encoders (9A and 10A) installed on the roller shafts of the transfer roller (9) and discharge rollers (10). FIG. 6 is a control block diagram of this system. Signals are input from a film sensor (16), and the pulse detectors (P1 and P2) on the transfer roller (9) and discharge rollers (10) to a CPU or any other control means (S). Based on these input signals, control signals are output to the supply roller drive motor (4c), transfer roller drive motor (9c), discharge roller drive motor (10C), film guide lever drive solenoid (23), film separating lever drive solenoid (23'), and film cutter drive solenoid (17A).

Figure 7:
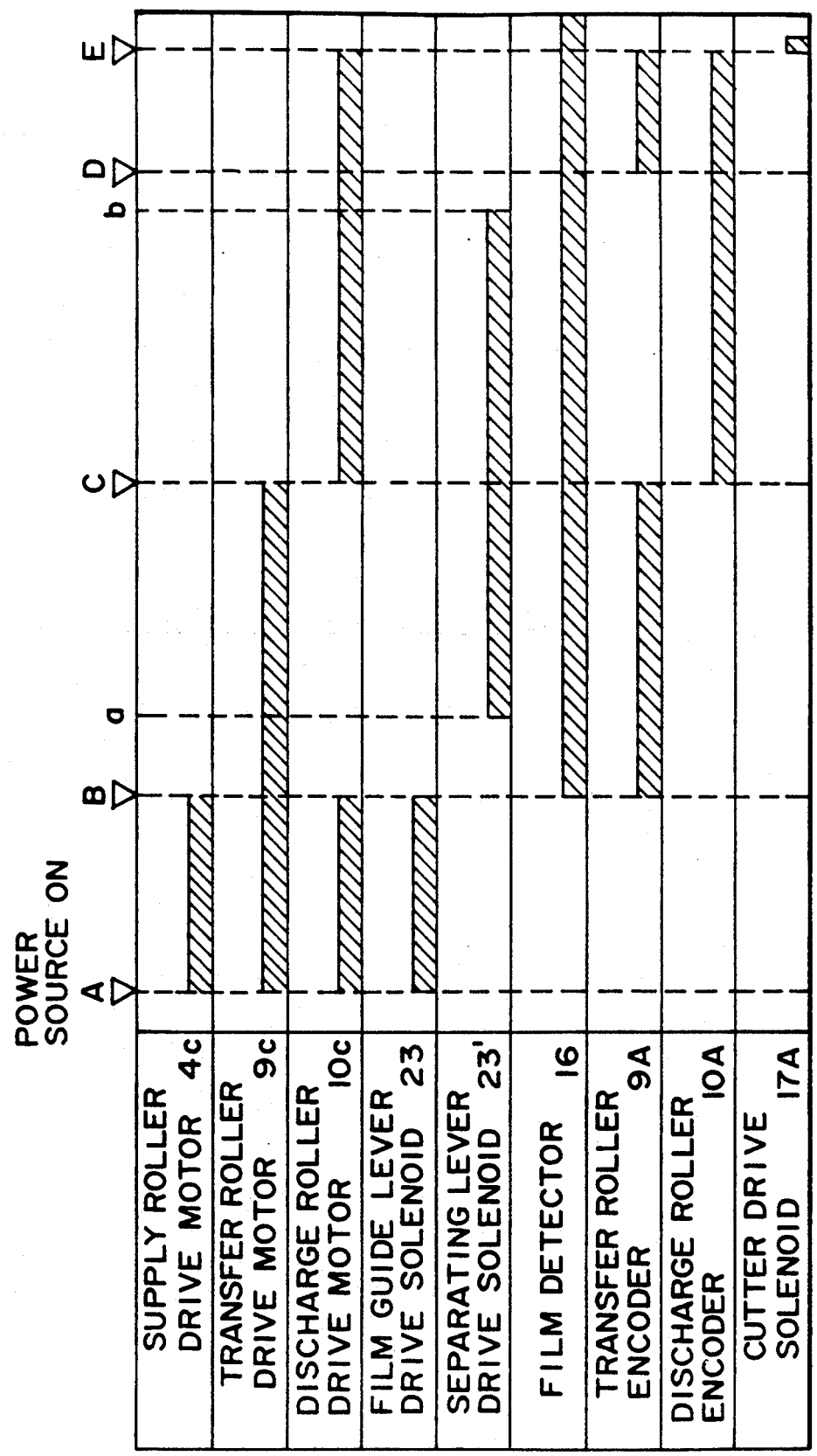
FIG. 7 is a timing chart for the control block shown in FIG. 6.

FIG. 7 is a timing chart for the said control system. In the interval of A and B in the chart, film (F) is loaded. In the state shown in FIG. 1, film (F) is transported until the film supply rollers (4), transfer roller (9), and discharge rollers (10) are driven and the film top is detected by the sensor (16). Film is detected at point B.

In the interval of B and C, film (F) is stored. When the transfer roller (9) is driven, film (F) is transferred to the storage chamber (8). The amount of film (F) fed into the storage chamber (8) is calculated based on the number of pulses proportional to the number of rotations of the transfer roller (9) that the encoder (9A) has detected. Then, when a certain amount of film is stored in the storage chamber (8) and film (F) has formed loops (in the interval of B and A), the film separating lever solenoid (23') is driven. The state of the storage chamber (8) becomes as shown in FIG. 2. Point C represents the state that the storage chamber (8) is full or a developing start time. The transfer roller (9) stops, the discharge rollers (10) are driven, and film (F) is discharged from the storage chamber (8). Namely, in the interval of C and D, film (F) is being discharged. The amount of film (F) discharged from the storage chamber (8) is calculated based on the number of pulses proportional to the number of rotations of the discharge rollers (10) that the encoder (10A) has counted.

At point D, film is completely discharged from the storage chamber (8) and the amount of film is nil. The film separating lever (15) returns to the state shown in FIG. 1 before the amount of film stored becomes zero (at point b). This is achieved through comparison between the amount of film supplied and the amount of film discharged. At point D, no film loop is present in the storage chamber (8). Along with film (F) transported by the discharge rollers (10), the transfer roller (9) rotates. This causes the encoder (9A) of the transfer roller (9) to generate a pulse signal. After that, the last exposed image on film (F) at the exposure point on the photography roller (6) is fed to the position before the film passes through the cutter (ponit E). Then, the film cutter drive solenoid (17A) is activated to cut off the film (F). Thereafter, the operation sequence of B to E is repeated.

Figure 8:
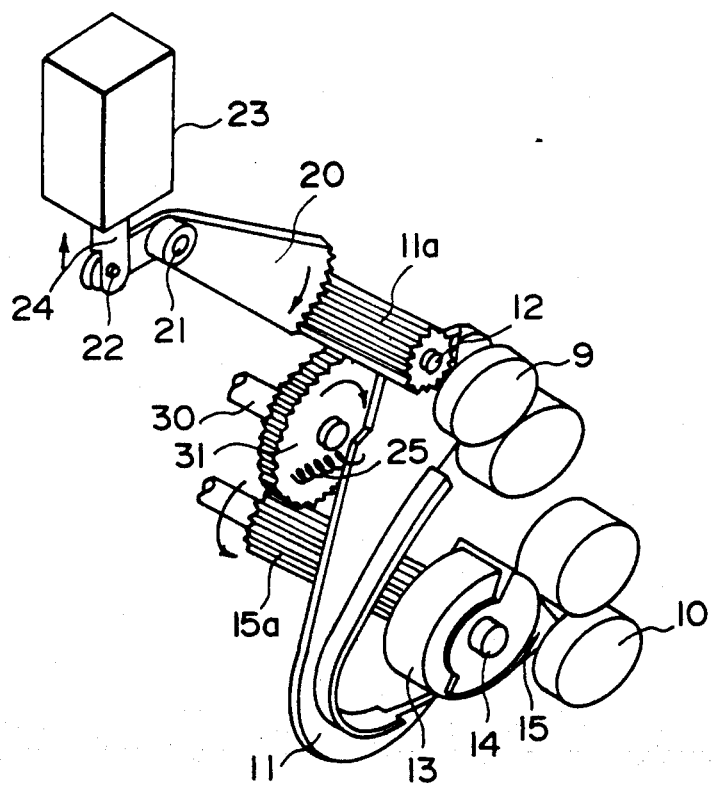
FIG. 8 shows a perspective view for the outline configuration of the driving system of the film guide member in the storage chamber which is implemented in another embodiment of this invention.

FIG. 8 shows another embodiment of this invention. To make the explanation simple, only the differences from the previously embodiment are described below.

In the previously described embodiment, the film guide lever (11) and film separating lever (15) are activated independently by different drive sources. However, in this embodiment, the film guide lever (11) and film separating lever (15) are interlocked by the same drive source. The other configuration is identical to that for the said embodiment. The same components are assigned the same numbers or marks as those for the said embodiment. Their description is omitted.

This invention has the above-described configuration and operation. A film guide member that forms a certain film transfer line is installed in the storage chamber. Thereby, curled film or thin film without stiffness can be transported automatically and securely. In addition, when the film guide member is withdrawn, film can be stored in the storage chamber. Even if a large amount of film is stored in the storage chamber, the film loops are made apart prior to the transfer means during transportation. This prevents the occurrence of such a trouble that film is wound around a discharge means or jammed.

Next, the developing unit is described based on embodiments shown in FIGS. 9 to 38.

Figure 9:
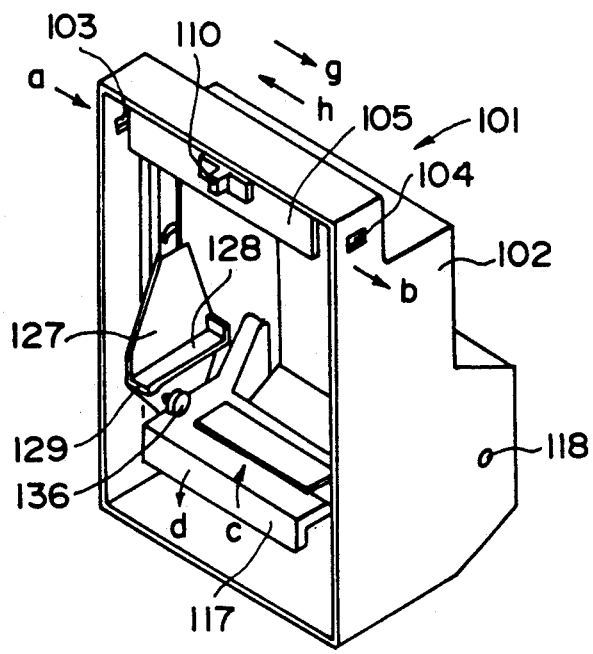
Figure 10:
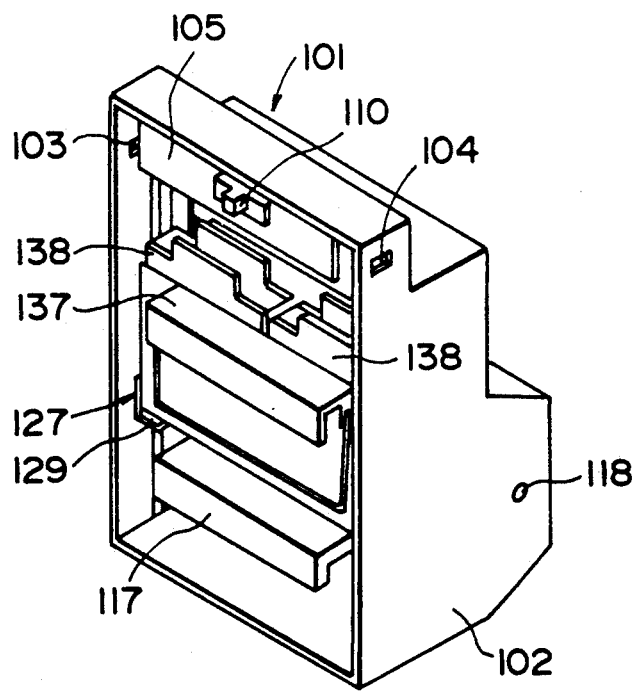
Figure 11:
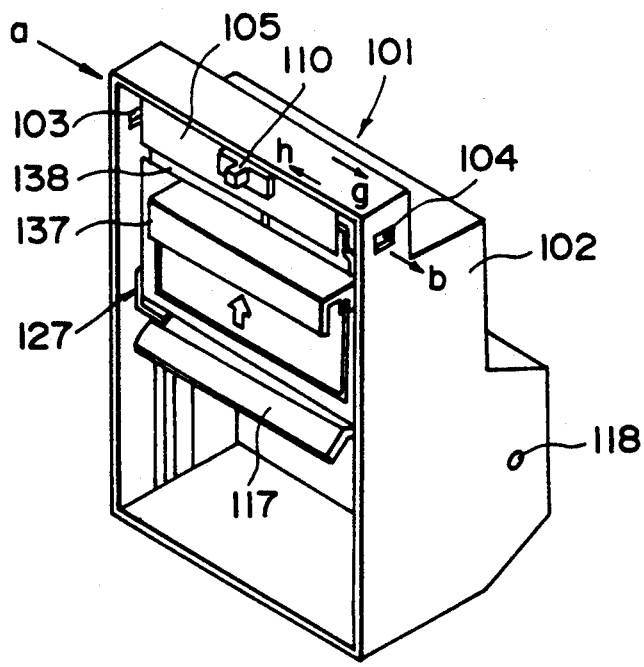

FIG. 9 shows a developing unit in which this invention is adopted. 102 represents a box-type main unit, one side of which is open. On the top side of the main unit (102), a film inlet (103) and film outlet (104) are provided facing each other. 105 represents a fixing member, which is installed on the inner top of the main unit (102). The fixing member (105) can be freely slid in the arrow (g and h) directions or laterally. The fixing member (105) has an approximate bracket-shaped (]) cross section shown in FIG. 12. On the top plate (105), guide holes (106) are formed longitudinally. The side plates (105b) of the fixing member (105) creates an internal width X enough to insert the film transport unit mentioned later. Their bottoms are diverged outward as shown in FIGS. 21 and 22. Into these guide holes (106), cone-tipped positioning protrusions (107) are inserted from above. Their collars (108) retain the fixing member (5). The fixing member (105) is secured with pairs of facing pins (109) attached on the side plates (105b) from inside. In FIG. 9, 110 represents a knob attached onto the front of the fixing member.

111 represents a guide hole drilled on the side plate (105b) of the fixing member (105), and (112), a stopper. (113) represents a lock member attached to the main unit (102). The lock member (113) is provided with a longitudinal guide hole (114) to which pins (115) are inserted. The pins (115) are protruded to the main unit (102). Therefore, the lock member (113) can be slidable in the vertical direction or directions of arrows e and f along the pins (115). claw (116) is provided on the top of the lock member (113). The claw (116) is inserted into the guide hole (111) of the fixing member (105).

Figure 13:
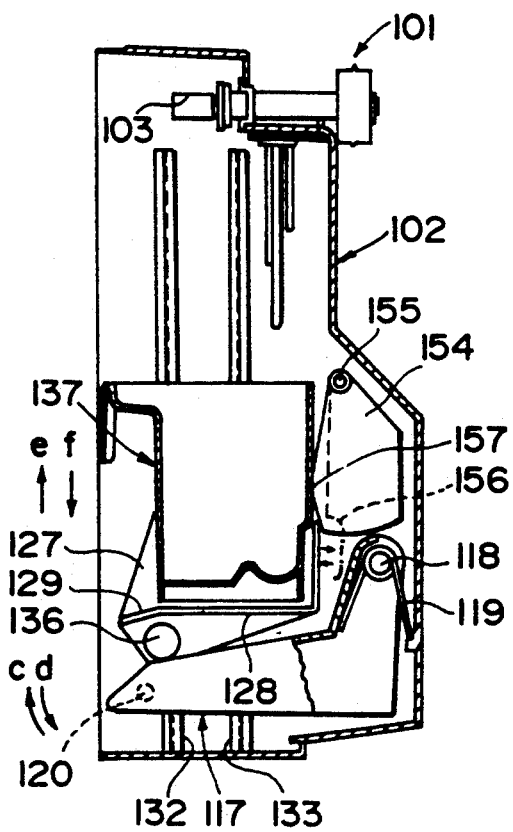
Figure 14:
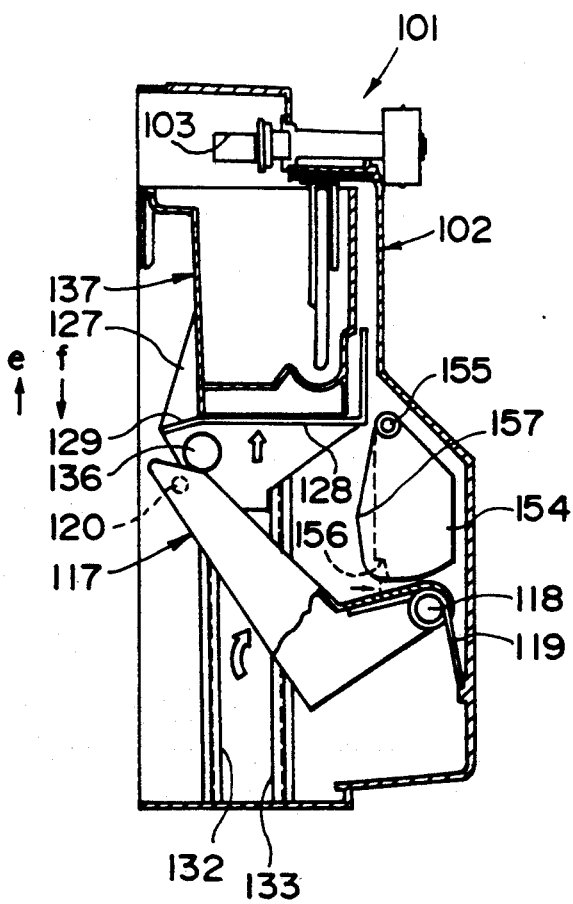

In FIG. 9, a lever (117) is attached onto the bottom of the main unit (102) and can be rotated as indicated with arrows c and d with the horizontally-set rotation axis (118) as a center. The lever (117) has a surface tilting from the end to the front as shown in FIG. 13. A twisted coil spring (119) is wound around the rotation axis (118). One end of the spring is attached to the inner surface of the main unit (102), and another end, to the back of the lever (117). Therefore, with the resiliency of the twisted coil spring, the lever (117) is always energized in the c-arrow direction (upward) with the rotation axis as a center.

FIG. 16 shows the locking mechanism of the lever (117). The lever (117) is provided with a rod (120) which slides laterally in FIG. 16. The rod (120) is terminated with a flange (121). A spring (123) is interposed between the flange (121) and a base (122) formed on the back of the lever (117). Therefore, the rod (120) is energized rightward in FIG. 16 owing to the resiliency of the spring (123), and can be moved laterally by sliding a knob (124). On the side wall of the main unit (102), recesses (125 and 126) in which the end of the rod can rest are provided at upper and lower positions.

Figure 18:
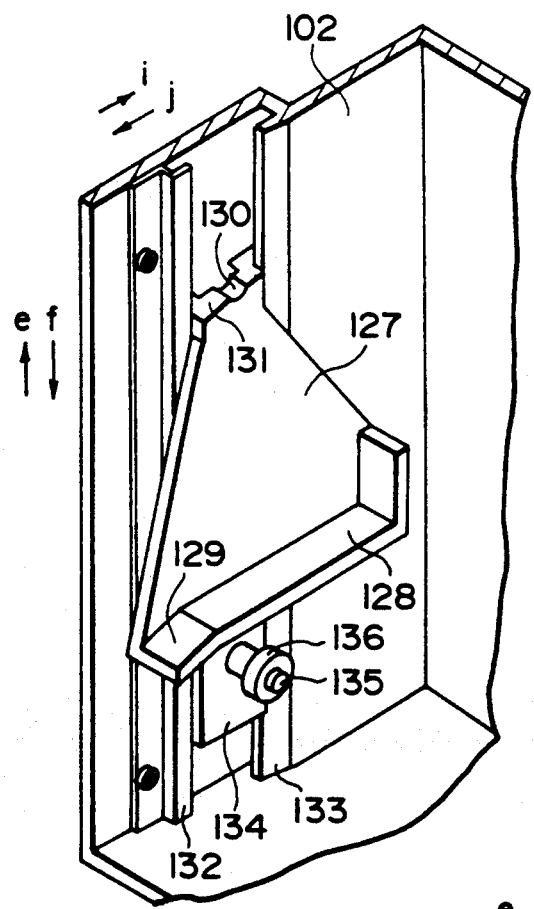

FIG. 18 shows a lift (127) installed on the wall of the main unit (102) which can move up and down. The lift is designed to accommodate a development container mentioned later. The lift having an approximate triangle shape is provided with a horizontal frame (128) at its bottom. The front portion of the horizontal frame (128) forms a slant guide surface (129). In addition, a supporting dent (130) is formed on the top surface of the lift (127) to support the development container. A guide surface (131) tilting forward is provided on the top surface of the lift (127). The guide surface (131) and the guide surface (129) are designed to help load a development container smoothly.

(132) and (133) represent a pair of guide rails installed in the main unit (102). A supporting frame (134) integrated with the said lift (127) is inserted onto the guide rails (132 and 133), which can be slidable vertically (in the directions of arrows e and f). In the lower part of the supporting frame (134) of the lift (127), an shaft (135) is protruded inward and provided with a roller (136) which rotates with the shaft (135) as a center.

In the embodiment shown, the lift (127), supporting frame (134), and guide rails (132 and 133) installed on the left side of the main unit are described for convenience sake. Needless to say, the same configuration is installed on the opposed right side of the main unit (102).

Figure 19:
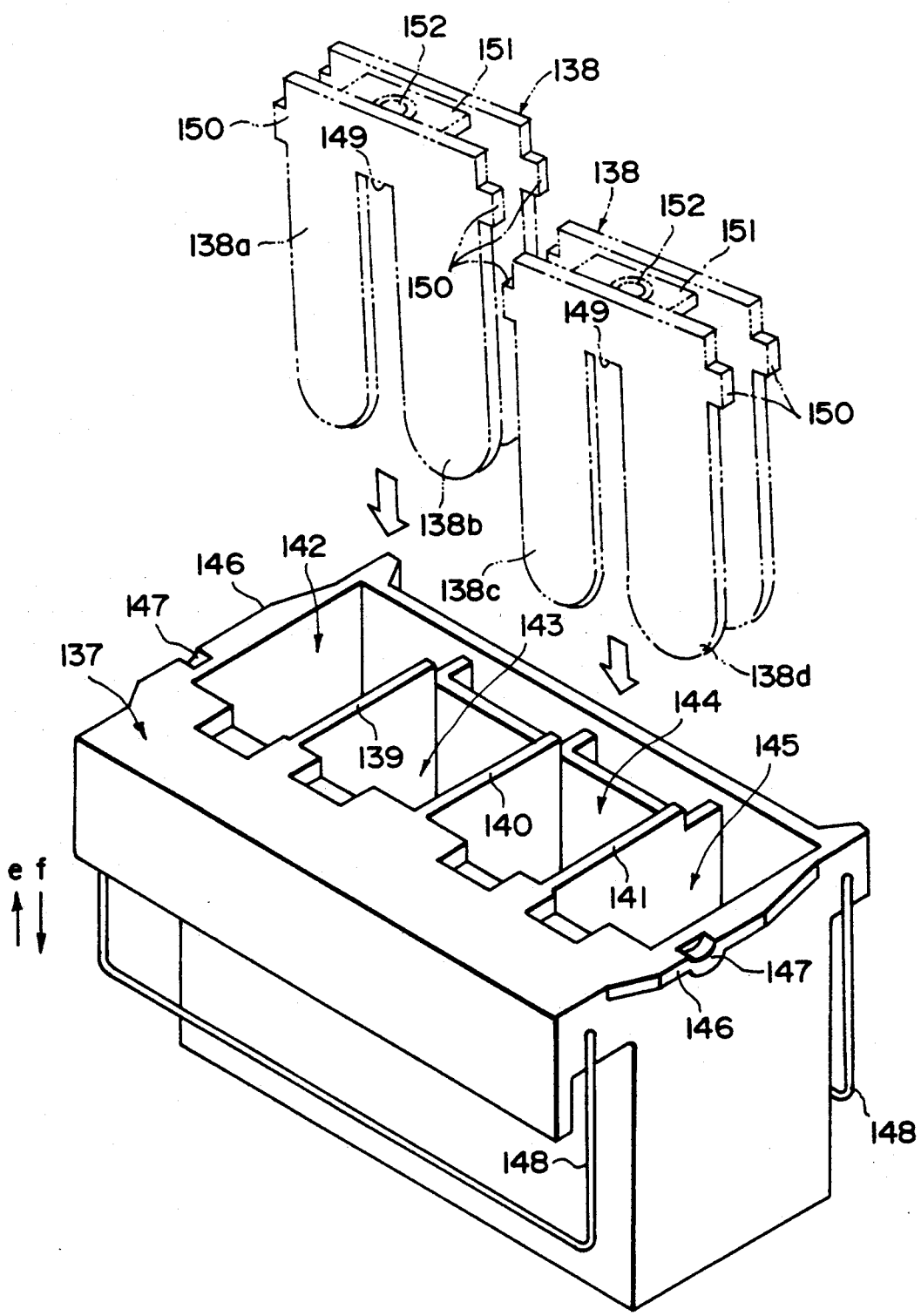
Figure 25:
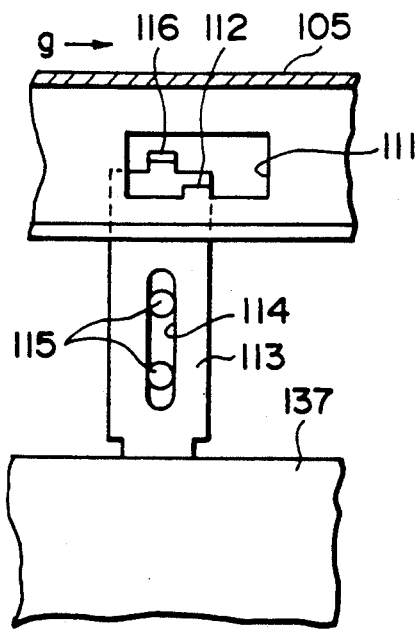

FIG. 19 shows a perspective view of a development container (137) in which this invention is adopted and a film transport unit (138) which is accommodated into the development container (137). The development container (137) is partitioned with screens (139-141) to form a developing tank (142), fixing tank (143), and washing tanks (144 and 145). These tanks are filled with the respective processing solutions. On the top frames at both sides of the development container (137), two down-facing lugs (147) are formed. The lugs (147) match the supporting dents (130) on the top surfaces of the lifts (127). (148) represents a handle attached to the front and back sides of the development container (137).

The film transport unit (138) integrates a developing rack (138a), fixing rack (138b), and washing racks (138c and 138d). On the upper parts of both sides of the film transport unit (138), banks (150) are formed. The film transport units (138) have longitudinal notches (149). When the film transport unit (138) is lowered as indicated with arrows, the developing rack (138a) and fixing rack (138b) are accommodated into the developing tank (142) and fixing tank (143) respectively extending beyond screens (139). The washing racks (138c and 138d) are accommodated into the washing tanks (144 and 145) extending beyond screens (141). At this time, banks (150) are placed on the top end surfaces of the frames (146) and screen (140), thus holding the film transport unit (138).

Figure 12:
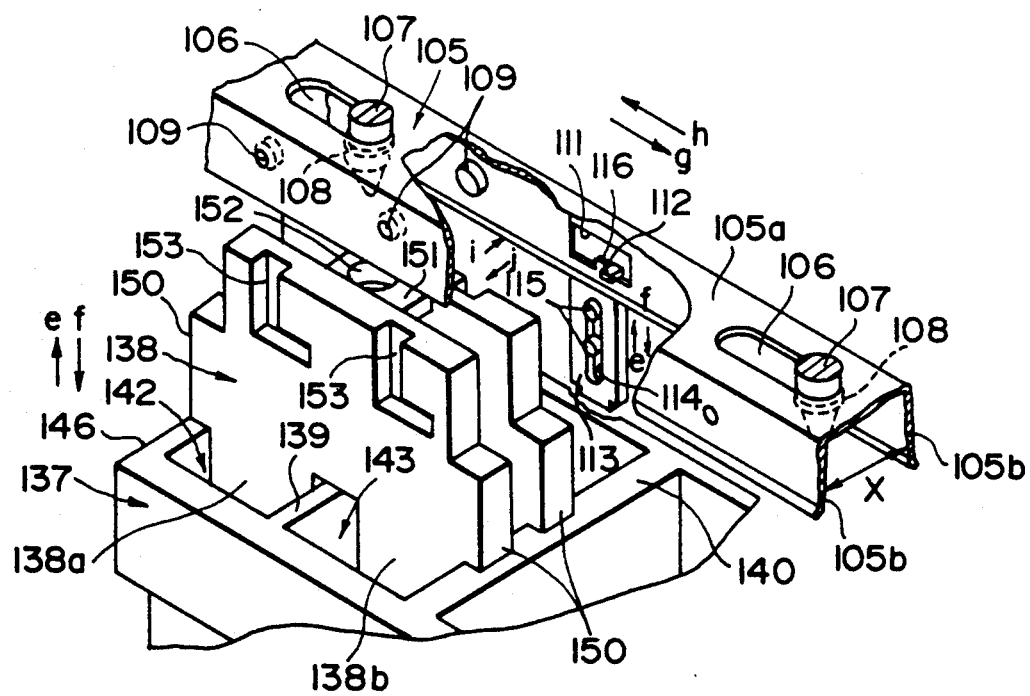

Now, as shown in FIG. 12, a coupling unit (151) on the top of the film transport unit (138) has a hole (152) in its approximate center into which the tip of the protrusion (107) is fitted. On the front and back surfaces of each film transport unit (138), two L-shaped guide grooves (153) are formed. The guide grooves (153) have the depth and size enough to insert the pins (109) of the fixing members (105), and are spaced each other according to the spacing of the pins (109). In FIG. 12, the guide grooves (153) are formed only on the film transport unit (138) which is accommodated into the developing tank (142) and fixing tank (143). Needless to say, the same guide grooves (153) are formed on the other film transport unit (138) which is accommodated into the washing tanks (144 and 145).

Figure 15:
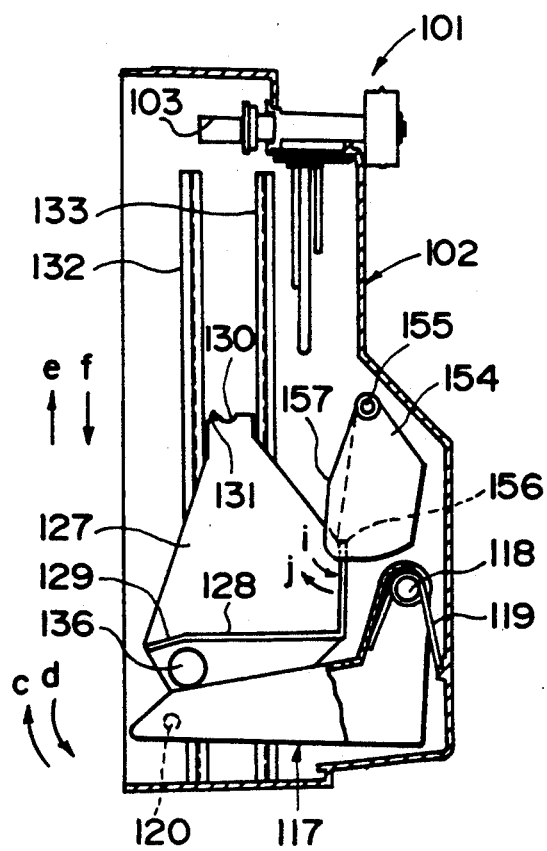
Figure 17:
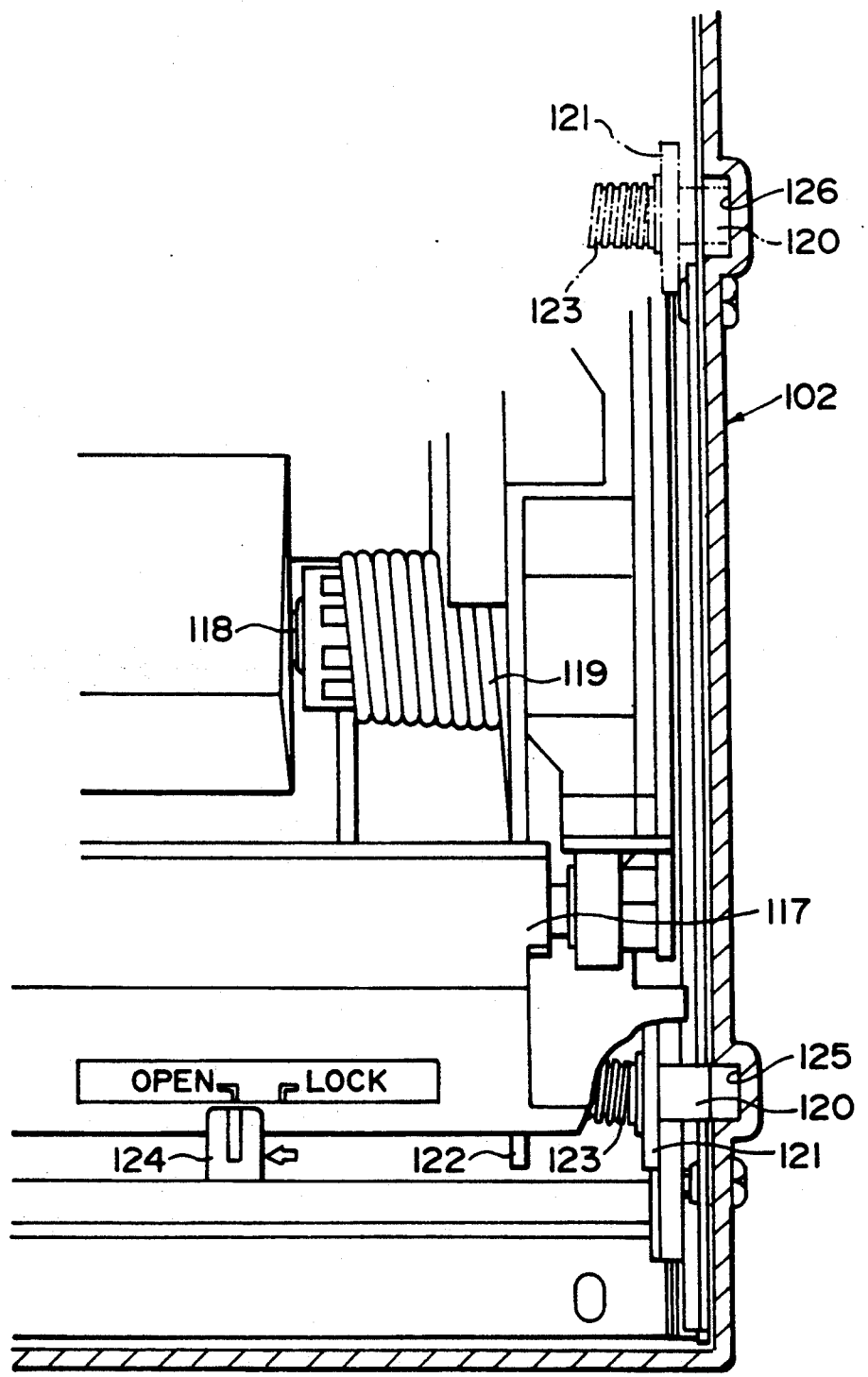

In FIG. 13, (154) represents a stopper to control the ascending movement of the lift (127). The stopper (154) is mounted to the main unit (102) so that it can swing with respect to the rotation axis (155). The front part of the stopper (154) or a part of the stopper on the side of the lift (127) has an indent (156) and provided with a cam (157). The rotation axis (155) of the stopper (154) is eccentric leftward and the stopper is to constituted that the right half of the stopper (154) across the rotation axis (155) is heavier. Thereby, the stopper (154) is usually in the position swung in the j-arrow direction as shown in FIG. 15 due to its own weight. The top end of the frame (128) of the lift (127) touches the indent (156).

The operations of this embodiment are described below. First, in the state that a development container (137) is not accommodated in the main unit (102) as shown in FIG. 9, the stopper (154) is at the position shown in FIG. 15 due to its own weight. The top end of the frame (128) of the lift (127) rests in the indent (156).

As shown in FIG. 16, the knob (124) of the lever (117) is set at the LOCK position. If an operator slides the knob (124) to the OPEN position carelessly, the rod tip (120) comes off from the setting recess (125).

However, the lift (127) will not move upward due to the resiliency of the spring (119) because the top end of the frame (128) is stopped by the stopper (154). This prevents the occurrence of such an accident that the lever (117) is popped up abruptly by the resiliency of the spring (119) resulting from an operator's careless operation.

Figure 20:
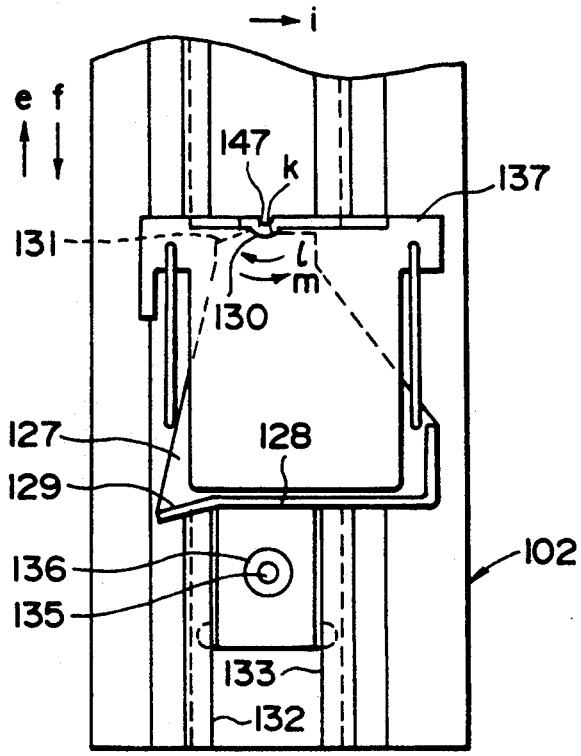

The film transport units (138) is stored into the development container (137) filled with processing solutions as shown in FIG. 19. Then, the assembly is installed in the main unit (102). The guide surfaces (129 and 131) of the lifts (127) on which the development container (137) is loaded help installing the assembly smoothly. On this stage, the lugs (147) of the development container (137) are fitted into the supporting dents (130) of the lifts (127) as shown in FIG. 20. Thus, the development container (137) is retained at two points or a pair of left and right supporting dents. Owing to a tolerance between the bottom of the development container (137) and the frame (128), the development container (137) can swivel a bit in the directions of arrows 1 and m with the contact k as a supporting point. In this state, as shown in FIG. 21, the protrusion (107) of the fixing member (105) may be deviated by a dimension n from the center of the film transport unit (138).

On the other hand, when the development container (137) is loaded on the lift (127) as mentioned above, the back of the development container (137) pushes the cam (157) of the stopper (154) in the i-arrow direction as shown in FIG. 13, the top end of the frame (128) is detached from the indent (156). If the development container (137) is not mounted properly, the stopper (154) is not released in the same way as mentioned previously. Then, the knob (124) is slid to the OPEN position, and the rod tip (20) comes out of the set recess (125). Then, the lever (117) backed up by the resiliency of the string (119) is balanced with the weights of the development container (137) and film transport unit (138), and can swivel as arrow-marked with the rotation axis as a center. As this time, the roller (136) of the lift (127) rolls down along the slant surface of the lever (117) and moves up in a unit with the supporting frame (134) along the guide rails (132 and 133). Then, when the roller (136) moves up to a given position, the rod tip (120) enters the upper setting recess (126) by the resiliency of the spring (123) as indicated with a dot-dash line in FIG. 17. Then the lever (117) and lift (127) are held at the UP position. The stop position or the position of the setting recess (126) is a position where film (not illustrated) fed from the film inlet (108) or film sent out of the film outlet (104) can be transported smoothly.

While the lift (127) is moving up, the center of the fixing member (105) may not align with the center of the film transport unit (138) initially. As shown in FIG. 22, as the development container (137) is being inserted into the fixing member (105), film transport unit (138), and development container (137) become tilted by a minute angle P. Then, as the lift (127) moves up further, the film transport unit (138) adjusts its position while tracing the orbit of arrow Q. If the deviation n is too large, the film transport unit (138) slides on the top surface of the development container (137) little by little in the r-arrow direction while being inserted into the fixing member (105). Thus, the film transport unit (138) adjusts its position. Position adjustment of the film transport unit (138) involves the developing racks (138a), fixing racks (138b), and washing racks (138c and 138d) on both sides.

While the lift (127) is moving up, if the development container (137) does not touch the lock member (113) as shown in FIG. 23, the claw (116) of the lock member (113) is positioned on the right side of the stopper (112). As the development container (137) moves up, the claw (116) touches the lock member (113). Then, the claw (116) is pushed up as shown in FIG. 24. The protrusion (107) attached to the main unit (102) is fitted into the hole (152) of the coupling unit (151). The pins of the fixing member (105) have reached to the corners of the guide grooves (153).

Figure 26:
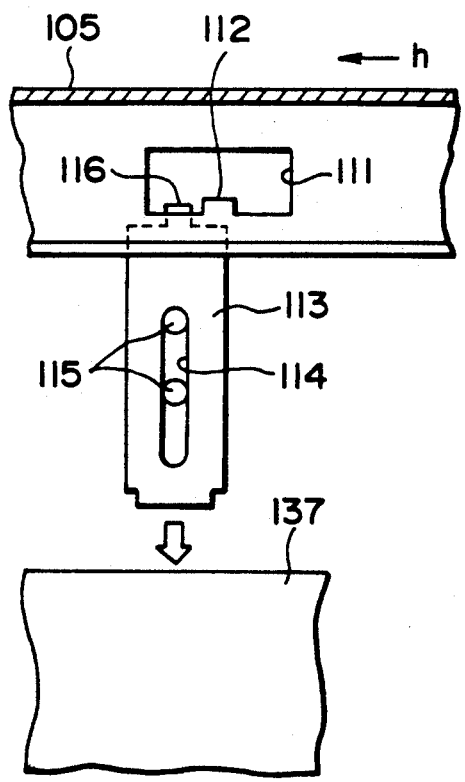

When the fixing member (105) is slid in the g-arrow direction shown in FIG. 28, the pins (109) advance to the ends of the guide grooves (153) and then stop there. During this operation, the claw (116) of the lock member (113) is positioned on the top left in the guide hole (111) because the fixing member (105) has slid. Namely, the claw (116) is posiitoned on the upper left of the stopper (112) in FIG. 25. After that, when the lever (117) is unlocked, rotated in the d-arrow direction in FIG. 13, and then lowered to the original lower position, the pins (109) of the fixing member (105) are secured at the deepest ends positions of the guide grooves (153). Only the development container (137) moves down together with the lift (127) as shown in FIG. 13. The film transport unit (138) remains at a given position or suspended. Thereby, an operator can replenish the development container with the detergent and processing solutions. Now, if only the development container (137) is lowered, the lock member (113) moves down due to its own weight as shown in FIG. 26 and the claw (116) stops at the left of the stopper (112). Therefore, even if an operator attempts to slide the fixing member (105) in the h-arrow direction, it does not slide because the stopper (112) is hooked by the claw (116). This prevents the film transport unit (138) from being dropped or damaged due to an operator's careless operation. Then, when the development container (137) is loaded on the lifts (127) and the said operation is performed, the film transport units (138) return to the states that they are accommodated in the development container (113). The fixing member (105) can now be slid in the h-arrow direction. Namely, the film transport unit (138) can be released.

In addition, the lugs (147) located above the center of gravity of the development container (137) are fitted into the supporting dents (130) at two points. This permits excellent stability and prevents processing solutions from being spilled.

Thus, when the lifts (127) are raised and film transport units (138) are fixed to the given positions of the main unit (102) (See FIG. 11), exposed film (not illustrated) if fed into the main unit (102) via the film inlet (103) as indicated with arrow a. Then, when film enters the film transport unit (138), it passes through the developing (142), fixing (143), and washing tanks (144 and 145) to be developed. After that, the film is sent out of the film outlet (104) as indicated with arrow b and then routed to the dry process (not illustrated).

To remove the film transport unit (138) from the main unit (102), if the film transport unit (138) is stored in the development container (137), the fixing member (105) is moved in the h-arrow direction and the pins (109) in the guide grooves (153) are slid as shown in FIG. 27. After that, the lever (117) is set to the OPEN position so that the rod tip (120) will get out of the set recess (126). The lever (117) is turned in the d-arrow direction in FIG. 13 against the resiliency of the spring (119) and returned to the DOWN position. Then, the rod tip (120) is fitted into the set recess (125) due to the resiliency of the spring (123) and the lever (117) stops. Then, if the development container (137) which accommodates the film transport units (138) is pulled forward, the stopper (154) swings in the j-arrow direction due to its own weight as shown in FIG. 15. Then, the indent (156) gets in touch with the top end of the frame (128) of the lift (127). In the above embodiment, depending on the up and down movements of the development container (137), the operation of the lock member (113) is controlled. The existence of the development container (137) is detected photoelectrically. The lock member (113) may be structured to be released depending on the detected result.

Figure 29:
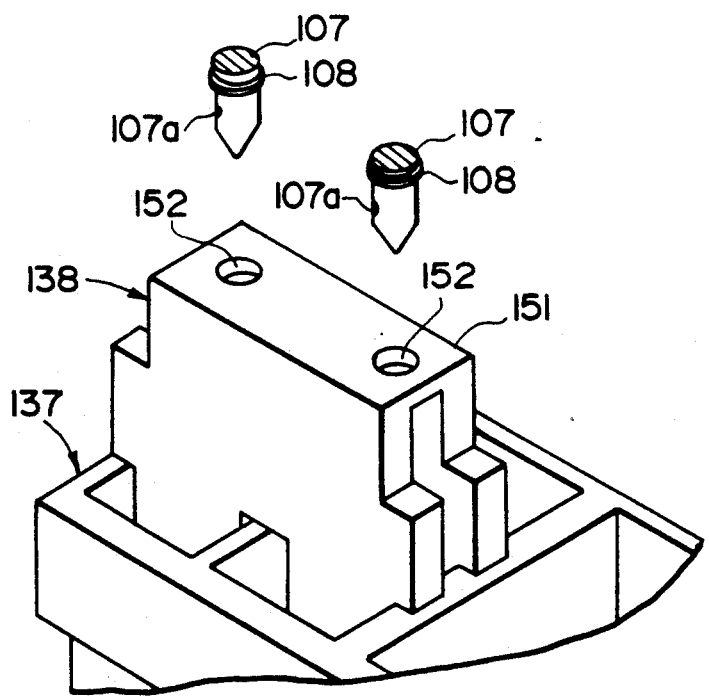

FIGS. 29 to 32 show the other embodiments of a film transport unit (138) fixing means. In FIG. 29, a click (107a) that can come out or in is provided on the side of the protrusion (107) whose diameter is smaller than that of the hole (152). The click (107a) is energized in the thrusting direction by a spring (not illustrated). In addition, the distance from the bottom of the collar (108) to the click (107a) is greater than the thickness of the coupling unit (151). In this embodiment, when the development container (137) is raised, the lower ends of the protrusions (107) enter the holes (152). The clicks (107a) touch the inner walls of the holes (152) and draw back into the protrusions temporarily. After that, the clicks thrust again at the bottom of the coupling unit (151). After a series of these operations, the film transport unit (138) is secured with the protrusions (107).

Figure 30:
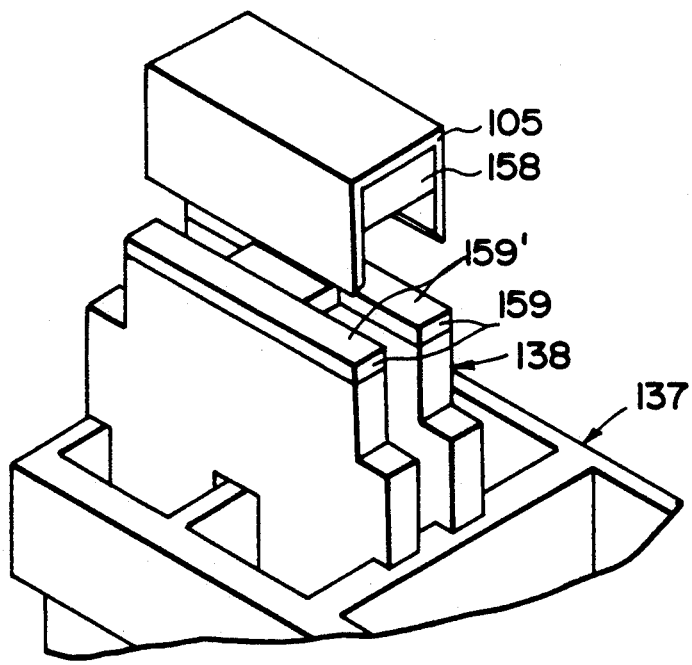

FIG. 30 shows another embodiment. A magnet (159) is fixed on the top of a film transport unit (138). The surface (159') of the magnet (159) is an S pole. On the other hand, the fixing member (105) incorporates an electromagnet (158). The polarity of the electromagnet (158) can be changed by an external power supply or circuit (not illustrated). Therefore, assuming that the polarity of the electromagnet (158) is reverse to that of the magnet (159) or the N pole, if the development container (138) is raised, the electromagnet (158) and magnet (159) attract each other and the film transport unit (138) can be locked with the fixing member (105). If the polarity of the electromagnet (158) is identical to that of the magnet (159), the lock of the film transport unit (138) can be released.

Figure 31:
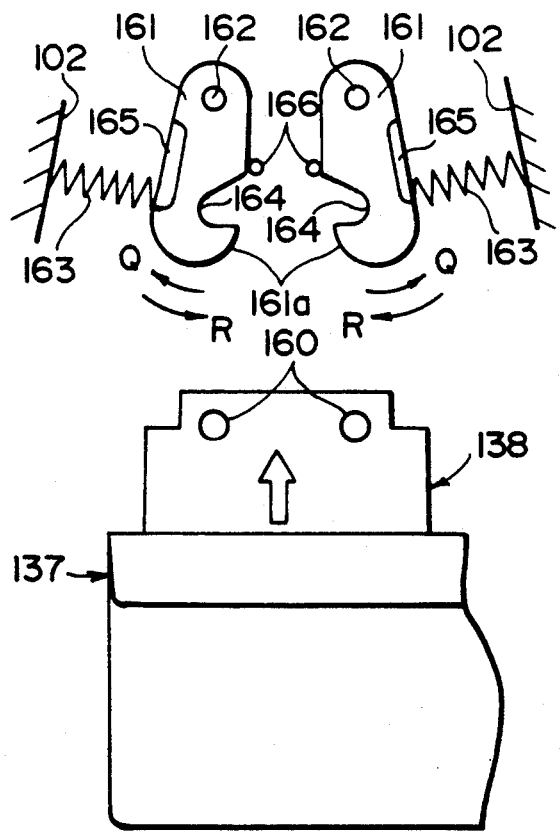
Figure 32:
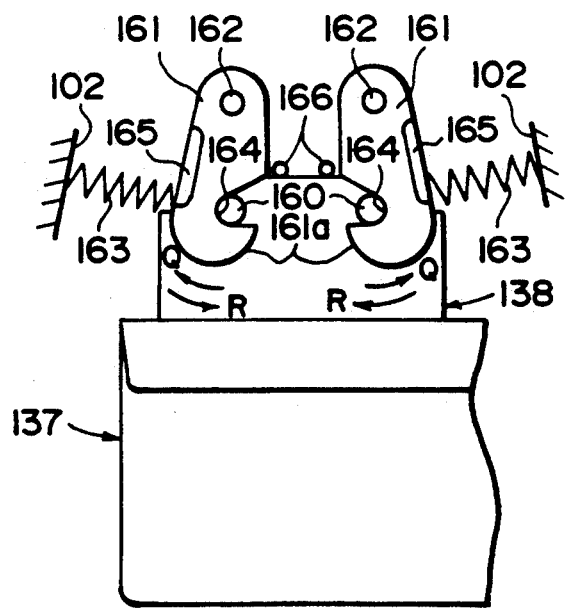
Figure 33:
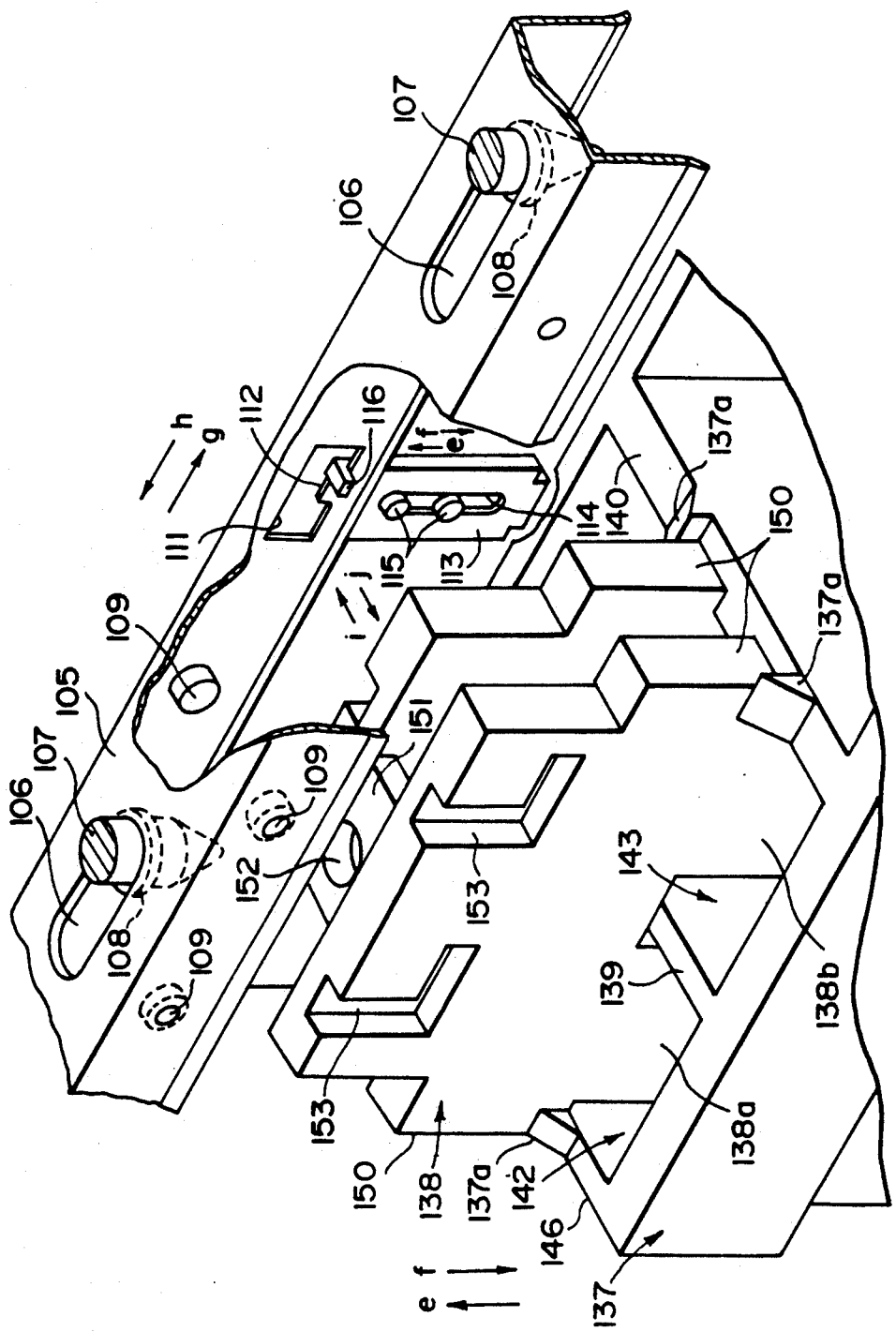

FIGS. 31 and 32 show the embodiments of another fixing member. On the side surface of the film transport unit (138) (at the same position as the safety groove (152) mentioned previously), dowel (160) is provided. A pair of movable arms is installed in the main unit (102). The movable arms (161) can swing in the directions of arrows Q and R with the rotation axis (162) as a center. A spring (163) is interposed between the mobile arms and main unit (102). The mobile arms (161) are energized in the R-arrow direction due to the resiliency of the spring (163). The bottom of each mobile arm (161) forms an arc, which is a guide surface (161a). Notches (164) are facing each other. (165) represents a lever attached to each mobile arm (161) and works to fix the mobile arm at a given position.

Next, the actions of this embodiment are described below. When the development container (137) moves up as indicated with an arrow, the dowel (160) comes to the guide surface (161a) of the mobile arm (161). The mobile arm (160) is pushed by the dowel (161) and then moves in the Q-arrow direction against the resiliency of the spring (163). As the development container (137) is moving up, the dowel (160) slides up along the safety guide surface (161a). When the dowel (160) comes to the same position as the notch (164), the mobile arm (161) swings in the R-arrow direction due to the resiliency of the spirng (163) and the dowel (160) gets into the notch (164). In this state, the film transport unit (138) is locked at a given position of the main unit (102). Even if the development container (137) is lowered, the film transport unit (138) remains locked.

If the mobile arm (161) is moved in the Q-arrow direction by holding the lever (165), the notch (164) is distanced from the dowel (160) and the lock of the film transport unit (138) is released.

FIG. 23 shows an embodiment of a positioning means for the film transport unit (138). On the top end surface of the frame (146) and screen (140) of the development container (137), a pair of wedges (137a) are provided. The wedges (137a) are spaced slightly wider than the thickness of the film transport unit (138) (in directions of arrows i and j). Thereby, if an operator puts the film transport unit (138) into the development container (137) in such a way that the claws (150) at both sides of the film transport unit (138) will be surrounded by the wedges (137a), the film transport unit (138) can be set to the development container (137) in the directions of arrow i and j properly.

Figure 34:
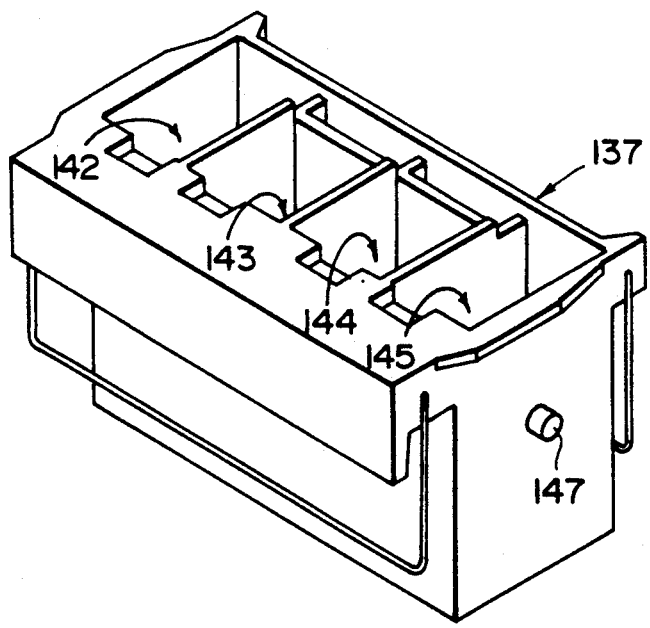
Figures 35, 36:
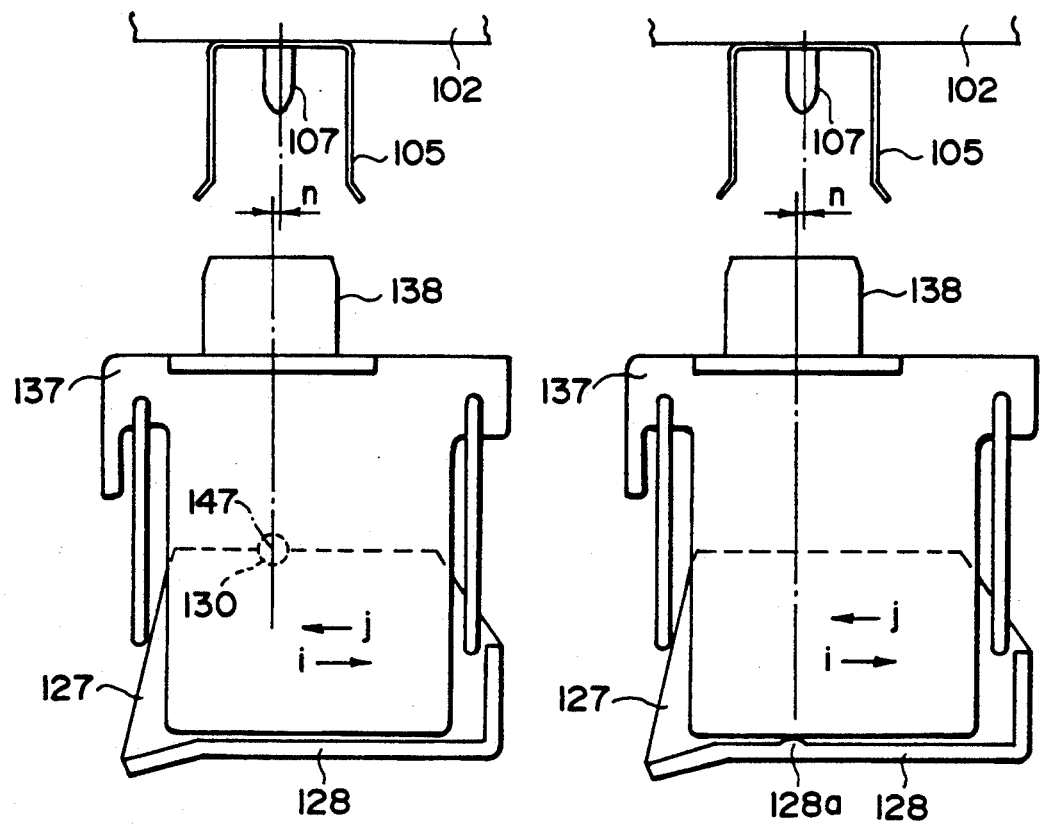

FIGS. 34 to 36 show embodiments of the other supporting means for the film transport unit (138) in the development container (137). In FIG. 34, a supporting lug (147) is attached in an approximate center of the side surface. The supporting lug (147) is also attached on the opposed side, although it is not illustrated. The lug (147) is not positioned above the center of gravity of the development container (137) unlike the previously-mentioned embodiment. This development container (137) is loaded on the lift (127) as shown in FIG. 35. The height of the lift (127) is approximately half that of the lift shown in FIG. 15. The lugs (147) are fitted into the supporting dents (130) on the upper sides. Thus, the development container is supported at two points. In this embodiment, to correct the deviation in dimension of the lug (107) and fixing member (105), a given amount of tolerance is provided between the bottom of the development container (137) and the frame (128) of the list (127).

In an embodiment shown in FIG. 36, a lug (128a) on the frame (128) of the lift (127) works to support the bottom of the development container (137) at two points. If the protrusion (104) of the fixing member (105) is positioned deviated from the film transport unit (138) by dimension n, as the lift (127) moves up, the development container (137) moves on the lug (128a) in directions of arrows i and j. Thus, the position of the film transport unit (138) is adjusted.

A pin which comes in and out according to the mounting or dismounting of the development container (137) is attached on the guide rail (132 or 133) as a means to prevent the lever (117) from popping up. Then, the pin is fitted into the main unit (102) so that it will be activated only when the development container (137) is loaded on the lift (127).

Figure 37:
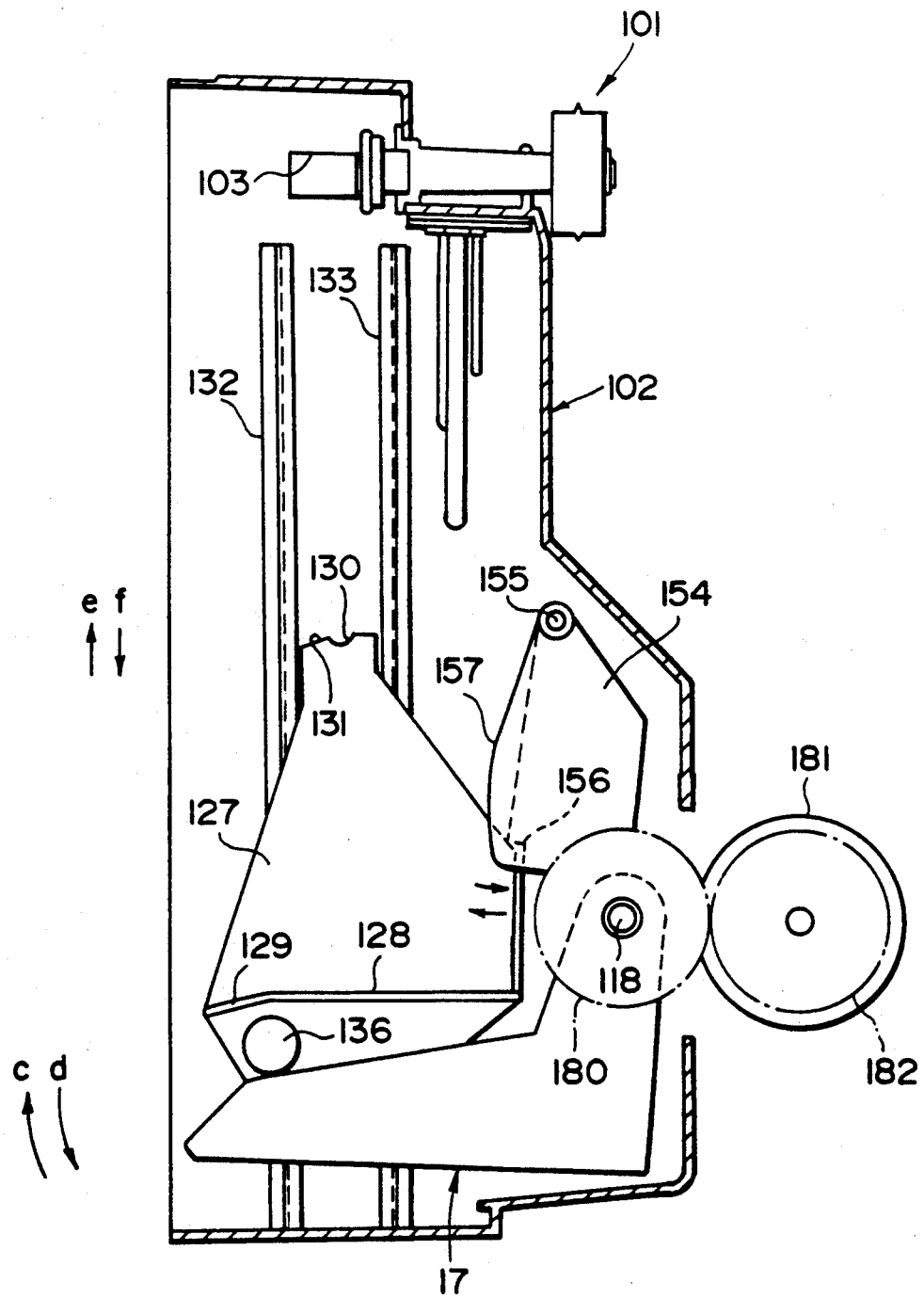

FIG. 37 shows another embodiment of a locking mechanism for the lever (117). A gear (180) which rotates along with the lever (117) is attached to the rotation axis (118) which rotates together with the lever (117). The gear (180) is engaged with a gear (182) of the motor (181). The motor (181) is electrically connected to the operations of the stopper (154). Synchronized with the swinging of the stopper (154), the motor (181) rotates by a certain angle counterclockwise. When the DOWN switch (not illustrated) is pressed, the motor (181) rotates clockwise to return to the original state.

Then, when the development container (137) is loaded on the lifts (127), the stoppers (154) swing and the motors (181) rotate counterclockwise. Then, the lift (127) moves up. When the film transport unit (138) reaches the given position, the motor (181) stops. When the DOWN switch (not illustrated) is pressed, the motor (181) rotates clockwise, and the lift (127) moves down and stops at the DOWN position illustrated. After that, when the development container (137) is unloaded from the lifts (127), the stopper (154) swings and locks the lift.

Figure 38:
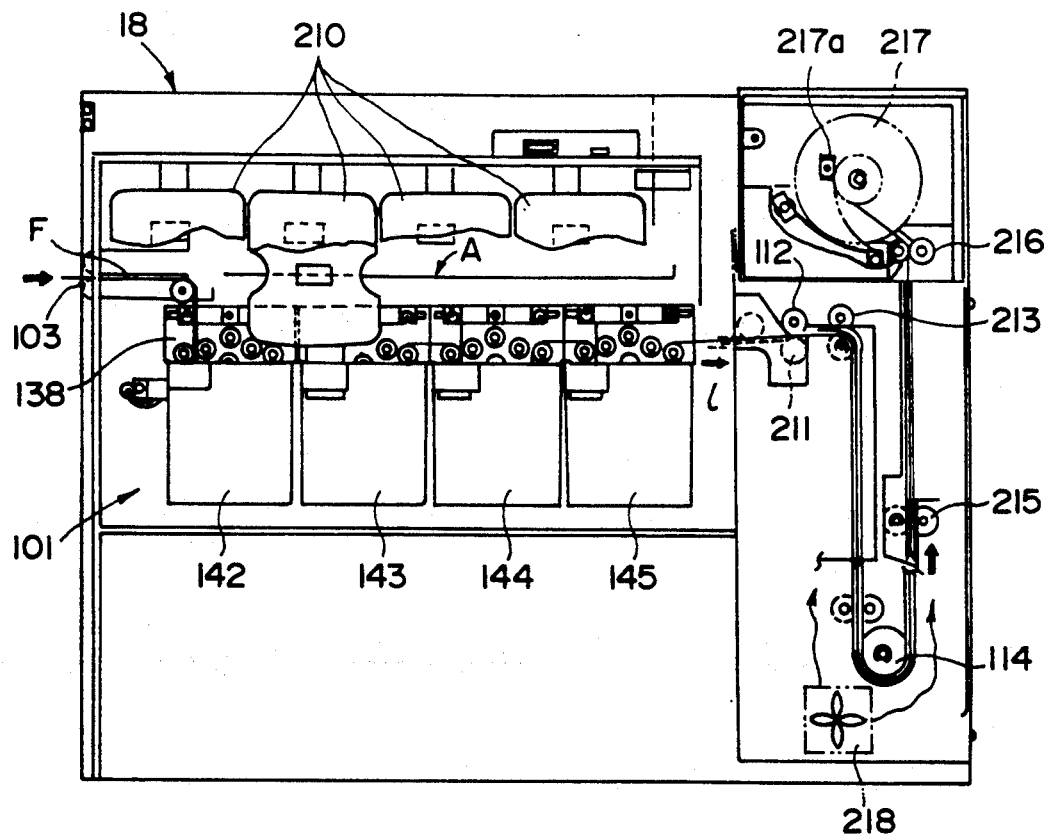
FIG. 38 shows a front view of the development system.
Figure 39:
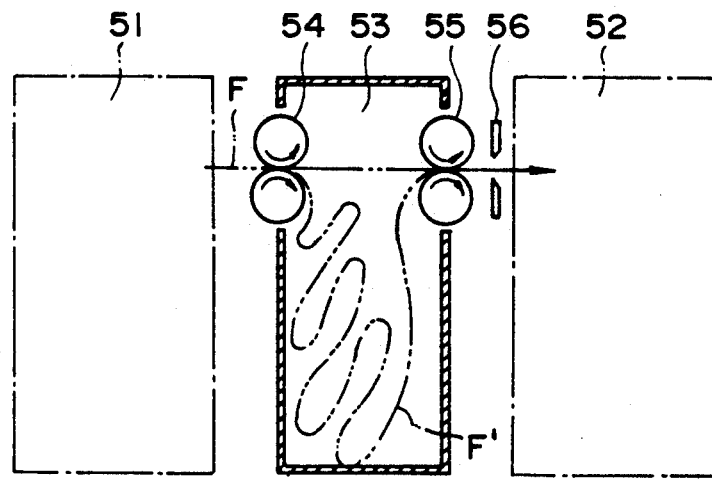
FIG. 39 is an outline configuration diagram of the conventional processor camera.

FIG. 38 shows an outline of the developing unit (18). The developing (142), fixing (143), and washing tanks (144 and 145) are filled with their processing solutions. (210) represents a refill bottle. When any processing fluid is running out, the fluid is refilled from the corresponding bottle.

FIG. (F) passing through the washing tank (145) is send in the 1-arrow direction, passes through the drive rollers (211 to 216), and then is fed into a winding reel (217). When film (F) has reached the winding reel (217), it is automatically wound up on the winding reel (217) by means of a tension arm (217a). In the interval until film reaches the said drive rollers (211 to 216), developed film (F) is dried up with hot air coming from a heater (218).

This invention has the configuration mentioned above, offering the following excellent features:

(1) The development container moves up in the main unit so that the film development units can be positioned at their given positions. This prevents the development container with which the film transport units are mounted in the main unit from being damaged or deformed. Moreover, when the development container is mounted or dismounted, the processing solutions contained will not spill over.

(2) The film transport units can be mounted and locked, or dismounted to or from the main unit without touching it directly. This prevents an operator from having his/her hand or clothes spoiled with any processing solution contained in the development container.

(3) The fixing member is merely slided horizontally to position the film transport units at the given positions in the main unit.

(4) The lock of the fixing member cannot be released unless the film transport units are accommodated in the development container. Thereby, the film transport units will not be dropped or damaged due to an operator's careless operation.

What is claimed is:

1. A recording system, comprising:
    a recording means for recording images on a film;
    a storage chamber for storing in a loop the film on which the images have been recorded by said recording means;
    a first transport means for transporting the film from said recording means into said storage chamber;
    a second transport means for transporting the film from said storage chamber into a next processing step;
    a first guide member movable between a first position for guiding a leading end of the film from said first transport means to said second transport means and a second position so that the film may be looped between said first transport means and said second transport means;
    a second guide member movable to form a first path, when said first guide member is in the first position, where the film is transported between said first guide member and said second guide member, and to form a second path, when said first guide member is in the second position, where the film is transported between said second guide member and a third guide member;
    drive means for moving said first and second guide members; and
    means for controlling said drive means to move said second guide member to the position where the second path is formed in a state where the film is loosened between said first and said second transport means after said first guide member has been moved to the second position.

2. A recording system according to claim 1, wherein said second and said third guide members are proximate to said second transport means, said second and said third guide members preventing the looped film from being transported to said second transport means when said second guide member has been in the position where the second path is formed.

3. A recording system according to claim 1, further comprising sensor means for detecting is the film is being transported by said second transport means, and wherein the control means drives said drive means on the basis of an output from said sensor means.

4. A recording system according to claim 3, wherein said control means moves said first guide member to the second position when said sensor means detects the film, and moves said second guide member to the position where the second path is formed when the film is looped between said first and said second transport means.

5. A recording system according to claim 1, wherein said control means, after having moved said first guide member to the first position, controls said second guide member to move to the position where the second path is formed when a predetermined amount of the film is stored between said first and said second transport means.

6. A recording system according to claim 1, wherein said third guide member is fixed to the apparatus, and said first guide member is positioned between said second and said third guide members when said second guide member is located at the position where the first path is formed.

7. A recording system according to claim 1, wherein said drive means drives said first and said second guide members independently from each other.

8. A recording system according to claim 7, wherein said second guide member, when located at the position where the first path is formed, approaches said second transport means, and when located at the position where the second path is formed, leaves said second transport means and approaches said third guide member.

9. A recording system according to claim 1, wherein said control means after beginning to transport the film from said storage chamber to the next processing step, controls said second guide member to move to the position where the first path is formed when a predetermined amount of the film is stored in said storage chamber.

10. A recording system according to claim 1, wherein the next processing step has processing means for developing the film.

11. A recording system according to claim 1, wherein the second transfer means has a cutter for cutting the film transferred by said second transfer means.

12. A photographing system, comprising:
a recording means for recording images on a recording medium;
a storage chamber for storing in a loop the recording medium on which the images have been recorded by said recording means;
a pair of rollers for transporting the recording medium from said recording means into said storage chamber;
a second pair of rollers for transporting the recording medium from said storage chamber into a next processing step;
a first guide member movable between a first position for guiding a leading end of the recording medium from said first pair of rollers to said second pair of rollers and a second position so that the recording medium may be looped between said first pair of rollers and said second pair of rollers;
a second guide member movable to form a first path, when said first guide member is in said first position, where the recording medium is transported between said first guide member and said second guide member, and to form a second path, when said first guide member is in the second position, where the recording medium is transported between said second guide member and a third guide member;
drive means for moving said first and second guide members; and
means for controlling said drive means to move said second guide member to the position where said first path is formed when, after said recording medium has begun to be transported to the next processing step, the recording medium stored in the storage chamber amounts to a predetermined value.

13. A recording system, comprising:
a recording means for recording images on film;
a storage chamber for storing in a loop the film on which the images have been recorded by said recording means;
a first transport means for transporting the film from said recording means into said storage chamber;
a second transport means for transporting the film from said storage chamber into a next processing step;
a first guide member movable between a first position for guiding a leading end of the film from said first transport means to said second transport means and a second position so that the film may be looped between said first transport means and said second transport means;
a second guide member movable to form, when said first guide member is in the first position, a path where the film is transported between said first guide member and said second guide member; and
a third guide member provided at an inner wall of said storage chamber to guide a side end of the film and prevent the film from being brought into contact with said first guide member when said first guide member is in the second position.

* * * * *

UNITED STATES PATENT AND TRADEMARK OFFICE
CERTIFICATE OF CORRECTION

PATENT NO.   : 5,146,264
DATED        : September 8, 1992
INVENTOR(S)  : Masahiro SHIRAI, et al.

It is certified that error appears in the above-identified patent and that said Letters Patent is hereby corrected as shown below:

COLUMN 1:

line 55, "into" should be deleted.

COLUMN 2:

line 8, "being," should read --being--; and
    line 11, "can," should read --can--.

COLUMN 4:

line 46, "P" should read --previously described--.

COLUMN 6:

line 30, "(ponit E)." should read --(point E).--; and
    line 36, "previously" should read --previously described--.

COLUMN 7:

line 66, "an" should read --a--.

COLUMN 8:

line 14, "solutions.On" should read --solutions. On--; and
    line 57, "to should read --so--.

UNITED STATES PATENT AND TRADEMARK OFFICE
CERTIFICATE OF CORRECTION

PATENT NO. : 5,146,264

DATED : September 8, 1992

INVENTOR(S) : Masahiro SHIRAI, et al.

It is certified that error appears in the above-identified patent and that said Letters Patent is hereby corrected as shown below:

COLUMN 13:

line 28, "send" should read --sent--.

Signed and Sealed this

Fifth Day of October, 1993

*Attest:*

BRUCE LEHMAN

*Attesting Officer*     *Commissioner of Patents and Trademarks*